US012763998B2

(12) United States Patent
Lu et al.

(10) Patent No.: US 12,763,998 B2
(45) Date of Patent: Oct. 13, 2026

(54) HIGH-GAIN, LOW-SENSITIVITY, CURRENT-INTEGRATING DECISION-FEEDBACK EQUALIZER

(71) Applicant: QUALCOMM Incorporated, San Diego, CA (US)

(72) Inventors: Lejie Lu, San Diego, CA (US); Younwoong Chung, San Diego, CA (US); Yu Song, San Diego, CA (US); Dong Ren, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 55 days.

(21) Appl. No.: 18/979,958

(22) Filed: Dec. 13, 2024

(65) Prior Publication Data

US 2026/0172293 A1 Jun. 18, 2026

(51) Int. Cl.
*H04L 25/03* (2006.01)

(52) U.S. Cl.
CPC .............................. *H04L 25/03878* (2013.01)

(58) Field of Classification Search
CPC ................................................ H04L 25/03878
See application file for complete search history.

(56) References Cited

U.S. PATENT DOCUMENTS

| | | | | |
|---|---|---|---|---|
| 2003/0206604 | A1* | 11/2003 | Lai | H04L 25/063 375/350 |
| 2018/0159514 | A1* | 6/2018 | Zerbe | G11C 7/02 |
| 2023/0130236 | A1* | 4/2023 | Song | H04B 1/18 455/552.1 |
| 2024/0137034 | A1* | 4/2024 | Gupta | H03M 1/1215 |
| 2025/0267046 | A1* | 8/2025 | Chung | H04L 25/03057 |
| 2025/0267047 | A1* | 8/2025 | Chung | H04L 25/0294 |
| 2026/0039514 | A1* | 2/2026 | Shi | H04L 25/03057 |

* cited by examiner

*Primary Examiner* — Jaison Joseph
(74) *Attorney, Agent, or Firm* — Loza & Loza, LLP

(57) ABSTRACT

An equalizing circuit has a first current summer and a first sampler. The first current summer may be configured to sum currents representative of a data signal and a first plurality of feedback signals when enabled by a first control signal. The first current summer may be enabled when the first control signal is in a first signaling state and disabled when the control signal is in a first signaling state. The first sampler may be configured to sample an output of the first current summer in accordance with timing provided by a first sampling clock signal. The first control signal may be in the first signaling state for a duration that is longer than a unit interval that defines the interval in which a bit of data is encoded in the data signal.

20 Claims, 11 Drawing Sheets

HIGH-GAIN, LOW-SENSITIVITY, CURRENT-INTEGRATING DECISION-FEEDBACK EQUALIZER

TECHNICAL FIELD

The present disclosure generally relates to high-speed data communication interfaces and, more particularly, to clock signals used by decision-feedback equalizers.

BACKGROUND

Electronic device technologies have seen explosive growth over the past several years. For example, growth of cellular and wireless communication technologies has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. Wireless devices may include a high speed bus interface for communication of signals between hardware components. High-speed serial buses offer advantages over parallel communication links when, for example, there is demand for reduced power consumption and smaller footprints in integrated circuit (IC) devices. For example, the high-speed bus interface may be implemented using a Peripheral Component Interconnect Express (PCIe) bus, Universal Serial Bus (USB) or Serial Advanced Technology Attachment (SATA), among others.

IC devices may include a serializer/deserializer (SERDES) to transmit and receive through a serial communication link. In high-speed applications, timing of the operation of a SERDES may be controlled by one or more clock signals. Data rates supported or available on a serial data link may be limited by interference, noise, reflections and other characteristics of the communication channel provided by the serial data link. Performance, accuracy or reliability of the SERDES may depend on the availability of equalizing circuits that can reduce errors in received data due to channel imperfections.

High frequency signals may be equalized at a receiver. The receiver may utilize a combination of summing and sampling circuits when processing received signals. The performance of these circuits can adversely affect the maximum data throughput of a bus interface due to timing limitations associated with circuits such as sequential logic circuits. There is an ongoing need for improved circuits that are used to equalize, amplify or otherwise process signals received via the bus interface.

SUMMARY

Certain aspects of the disclosure relate to systems, apparatus, methods and techniques that can be used in equalizing circuits in a receiver coupled to a serial data link, including receivers that include a high-frequency interface based on serializer/deserializer (SERDES) circuits. Certain aspects provide flexible configuration of equalizing circuits to enable operation circuit timing limitations ae reached.

In various aspects of the disclosure, an equalizing circuit has a first current summer and a first sampler. The first current summer may be configured to sum currents representative of a data signal and a first plurality of feedback signals when enabled by a first control signal. The first current summer may be enabled when the first control signal is in a first signaling state and disabled when the control signal is in a first signaling state. The first sampler may be configured to sample an output of the first current summer in accordance with timing provided by a first sampling clock signal. The first control signal may be in the first signaling state for a duration that is longer than a unit interval that defines the interval in which a bit of data is encoded in the data signal.

In various aspects of the disclosure, an apparatus includes means for summing currents representative of a data signal and a first plurality of feedback signals and means for sampling the first summed output signal. The means for summing the currents representative of the data signal and the first plurality of feedback signals may be configured to provide a first summed output signal. The currents representative of the data signal and the first plurality of feedback signals may be summed when the first control signal is in a first signaling state. The means for sampling the first summed output signal may be configured to operate in accordance with timing provided by a first sampling clock signal. The first control signal may be in the first signaling state for a duration that is longer than a unit interval that defines the interval in which a bit of data is encoded in the data signal.

In various aspects of the disclosure, a method for equalizing a data signal received over a serial data link includes summing currents representative of a data signal and a first plurality of feedback signals to provide a first summed output signal, and sampling the first summed output signal in accordance with timing provided by a first sampling clock signal. The currents representative of the data signal and the first plurality of feedback signals may be summed when the first control signal is in a first signaling state. The first control signal may be in the first signaling state for a duration that is longer than a unit interval that defines the interval in which a bit of data is encoded in the data signal.

In some aspects, the first control signal has a period that is twice the duration of one unit interval. The equalizing circuit may further include a first duty cycle control circuit adapted to configure a duty cycle greater than 50% for the first control signal. The first sampler may be configured to sample signaling state at the output of the first current summer at an edge in the first sampling clock signal and while the first control signal is in the first signaling state.

In certain aspects, the equalizing circuit further includes a second current summer and a second sampler. The second current summer may be configured to sum currents representative of the data signal and a second plurality of feedback signals when enabled by a second control signal. The second current summer may be enabled when the second control signal is in the first signaling state and disabled when the control signal is in the first signaling state. The second sampler may be configured to sample an output of the second current summer in accordance with timing provided by a second sampling clock signal. The second control signal may be in the first signaling state for a duration that is longer than one unit interval. The second control signal have a period that is twice the duration of a unit interval. The equalizing circuit may further include a second duty cycle control circuit adapted to configure a duty cycle greater than 50% for the second control signal. The second sampler may be configured to sample signaling state at the output of the second current summer at an edge in the second sampling clock signal and while the second control signal is in the first signaling state.

In some aspects, the second control signal may be a phase shifted version of the first control signal. The second sampling clock signal may be an inverted version of the first sampling clock signal. The first plurality of feedback signals includes delayed versions of the output of the first sampler and delayed versions of the output of the second sampler. The second plurality of feedback signals may include delayed versions of the output of the second sampler and delayed versions of the output of the first sampler.

DETAILED DESCRIPTION

Figure 1:
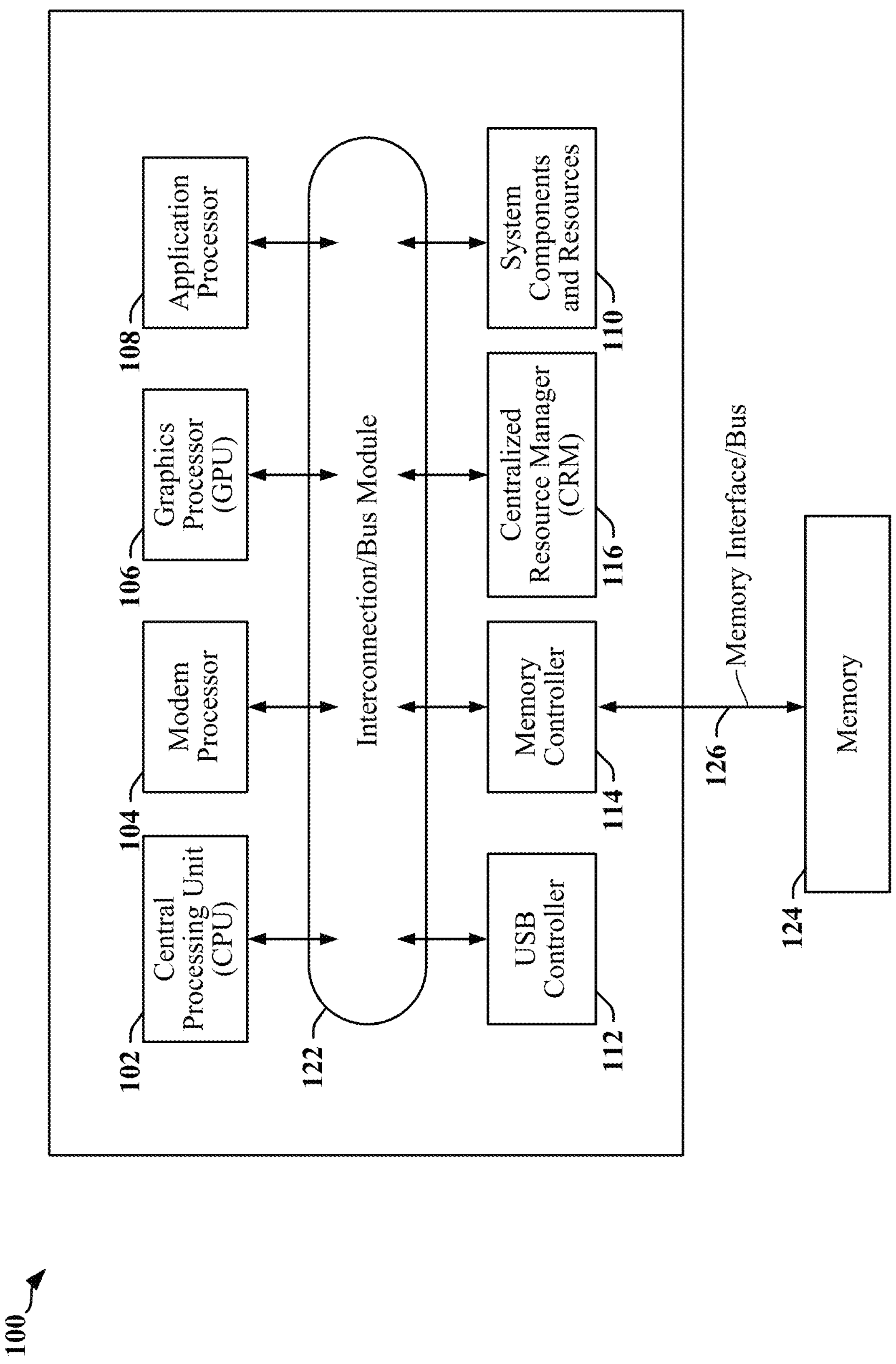
FIG. 1 illustrates an example of a system-on-a-chip (SOC) in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

With reference now to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

The terms "computing device" and "mobile device" are used interchangeably herein to refer to any one or all of servers, personal computers, smartphones, cellular telephones, tablet computers, laptop computers, netbooks, ultrabooks, palm-top computers, personal data assistants (PDAs), wireless electronic mail receivers, multimedia Internet-enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, size, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., CPU cores, etc.) configured to read and execute program instructions. The term "multiprocessor" is used herein to refer to a system or device that includes two or more processing units configured to read and execute program instructions.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors (DSPs), modem processors, video processors, etc.), memory blocks (e.g., read only memory (ROM), random access memory (RAM), flash, etc.), and resources (e.g., timers, voltage regulators, oscillators, etc.), any or all of which may be included in one or more cores.

Memory technologies described herein may be suitable for storing instructions, programs, control signals, and/or data for use in or by a computer or other digital electronic device. Any references to terminology and/or technical details related to an individual type of memory, interface, standard, or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.).

Process technology employed to manufacture semiconductor devices, including IC devices is continually improving. Process technology includes the manufacturing methods used to make IC devices and defines transistor size, operating voltages and switching speeds. Features that are constituent elements of circuits in an IC device may be referred as technology nodes and/or process nodes. The terms technology node, process node, process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs.

Certain aspects of the disclosure are applicable to circuits that generate, transmit, receive, process and/or propagate differential signals. A wire pair comprises two wires, connectors, interconnects or other conductors over which a differential signal is transmitted. The differential signal is carried in two phase versions over the wire pair, whereby the wires, connectors, interconnects or other conductors in the wire pair carry versions of the differential signal that are phase-shifted from each other by 180°. The versions of the differential signal transmitted over the wire pair may be referred to as complementary signals. The differential signal is transmitted over wires, connectors, interconnects or other conductors using voltages of equal voltage magnitude and opposite polarity. A received signal that represents the difference between the signaling state of the wire pair can be generated at a receiving device. An identical direct current (DC) offset from system ground carried by each wire of the pair may be referred to as a common-mode voltage. The common-mode voltage may be measured at the input terminals of a receiving device. An identical signal carried in-phase by each wire of the pair may be referred to as a common-mode signal. Common-mode noise affecting wires, connectors, interconnects or other conductors can be expected to induce a near-identical interference signal in the wire pair. The interference signal is typically cancelled by subtraction at the receiver and does not affect the received signal.

Certain aspects of this disclosure relate to receiver circuits used in interfaces that include high-speed serializer-deserializer (SERDES) circuits. SERDES circuits may be used to implement high-speed bus interfaces. SERDES circuits are used to convert data from parallel words to a serial stream of bits using a serializer and back to parallel words at the receiver using a deserializer. For example, the high-speed bus interface may be implemented in accordance with Peripheral Component Interconnect Express (PCIe) bus, Universal Serial Bus (USB) or Serial Advanced Technology Attachment (SATA), or other specifications and/or operated according to PCIe, USB, SATA or other protocols.

Certain receiver circuits are described herein that can be deployed in the analog front-end (AFE) of a receiver. In one aspect, techniques and circuits that can be used for receiving signals encoded using pulse amplitude modulation are disclosed. These techniques and circuits may relate to components of an AFE gain stage, which may include equalizers such as a decision-feedback equalizer (DFE), a variable-gain amplifier (VGA), buffers, summers, and so on. In one example, some aspects of the disclosure relate to a circuit that includes a summer and a sampler.

FIG. 1 illustrates example components and interconnections in a system-on-chip (SoC) 100 that may be suitable for implementing certain aspects of the present disclosure. The SoC 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that the processors may operate at a much higher frequency/clock rate than would be possible if the signals were to travel off-chip. The proximity of the cores may also allow for the sharing of on-chip memory and resources (e.g., voltage rails), as well as for more coordinated cooperation between cores.

The SoC 100 may include system components and resources 110 for managing sensor data, analog-to-digital conversions, and/or wireless data transmissions, and for performing other specialized operations (e.g., decoding high-definition video, video processing, etc.). System components and resources 110 may also include components such as voltage regulators, oscillators, phase-locked loops (PLLs), peripheral bridges, data controllers, system controllers, access ports, timers, and/or other similar components used to support the processors and software clients running on the computing device. The system components and resources 110 may also include circuitry for interfacing with peripheral devices, such as cameras, electronic displays, wireless communication devices, external memory chips, etc.

The SoC 100 may further include a Universal Serial Bus (USB) or other serial bus controller 112, one or more memory controllers 114, and a centralized resource manager (CRM) 116. The SoC 100 may also include an input/output module (not illustrated) for communicating with resources external to the SoC, each of which may be shared by two or more of the internal SoC components.

The processors 102, 104, 106, 108 may be interconnected to the USB controller 112, the memory controller 114, system components and resources 110, CRM 116, and/or other system components via an interconnection/bus module 122, which may include an array of reconfigurable logic gates and/or implement a bus architecture. Communications may also be provided by advanced interconnects, such as high performance networks on chip (NoCs).

The interconnection/bus module 122 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In some cases, the interconnection/bus module 122 may implement an arbitration scheme to prevent multiple master components from attempting to drive the bus simultaneously. The memory controller 114 may be a specialized hardware module configured to manage the flow of data to and from a memory 124 via a memory interface/bus 126.

The memory controller 114 may comprise one or more processors configured to perform read and write operations with the memory 124. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In certain aspects, the memory 124 may be part of the SoC 100.

Figure 2:
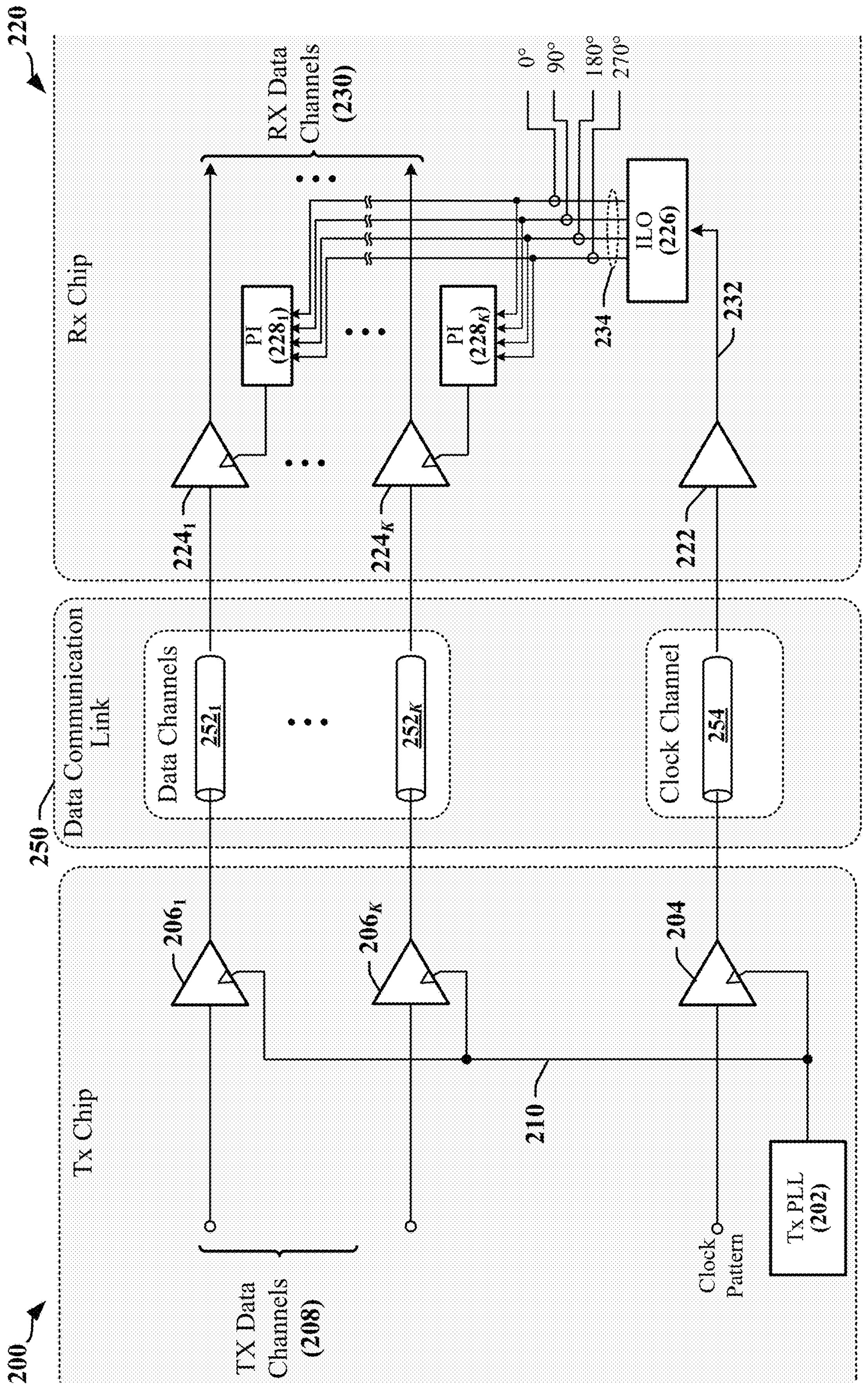
FIG. 2 illustrates an example of a system that employs a multi-channel data communication link.

FIG. 2 illustrates an example of a system that employs a multi-channel data communication link 250 to couple a transmitting device 200 with a receiving device 220. The data communication link 250 includes multiple channels $\mathbf{252_1}$-$\mathbf{252_K}$, 254 that provide a transmission medium through which signals propagate from a first device to a second device. In the illustrated example, the transmitting device 200 can be configured to transmit data signals over one or more data channels $\mathbf{252_1}$-$\mathbf{252_K}$ in accordance with timing information provided by a clock signal transmitted over a clock channel 254. The transmitting device 200 may include serializers (not shown) configured to convert parallel data into serial data for transmission over the data channels $252_1$-$252_K$. The transmitting device 200 further includes data drivers $206_1$-$206_K$ configured to generate data signals over the one or more data channels $252_1$-$252_K$ to the receiving device 220 through the data communication link 250.

In some examples, the transmitting device 200 includes a clock driver 204 that generates the clock signal forwarded over the clock channel 254. In other examples, the clock channel 254 is omitted and the receiving device 220 is equipped with clock recovery circuits that can recover timing information from signals transmitted over one or more of the data channels $252_1$-$252_K$ in order to generate receive clock signals. The channels $252_1$-$252_K$, 254 may be implemented using any type of transmission medium by which a data signal can propagate from the transmitting device 200 to the receiving device 220. Clock forwarding is common in communication systems, and provides the benefit that a phase locked loop (PLL) and other clock recovery circuits are not required in the receiving device 220. Typically, only one phase of the transmitter-generated clock signal is forwarded when clock forwarding is used. Limiting the number of clock signals can conserve power and the space that would be occupied by additional clock channels.

The receiving device 220 may be configured to receive and process the data signals. The receiving device 220 may generate additional phases of the received or recovered clock signal to obtain in-phase and quadrature (I/Q) versions of the clock signal to be used by phase interpolators $228_1$-$228_K$. A quadrature signal has phase that is shifted by 90° with respect to an in-phase signal. The phase interpolators $228_1$-$228_K$ may provide outputs that are phase-adjusted or phase-corrected I/Q versions of the clock signal. In one example, the outputs of each of the phase interpolators $228_1$-$228_K$ are provided to sampling circuits $224_1$-$224_K$.

Sampling circuits $224_1$-$224_K$. may be implemented using sequential logic. For the purposes of this disclosure, a sequential logic circuit refers to a logic circuit that has outputs that are state dependent. For example, certain latches or flipflops have an output that reflects the signaling state of its input when an edge occurs in a clock signal. In some instances, the output of a latch follows its input while the clock signal is in a first signaling state and locks its output when the clock signal transitions from the first signaling state to a second signaling state.

Clock generation circuits in the receiving device 220 may include oscillators, which are fundamental building blocks of modern electronics. Oscillators are often implemented as ring oscillators (ROs), which can offer advantages over other types of oscillator including reduced area footprint, power efficiency and scalability with technological process. In the illustrated example, the clock generation circuits in the receiving device 220 includes an injection-locked oscillator (ILO 226) that receives a clock signal 232 from a line receiver 222 coupled to the clock channel 254 and generates phase-shifted versions 234 of the clock signal 232, including I/Q versions of the clock signal 232.

Figure 3:
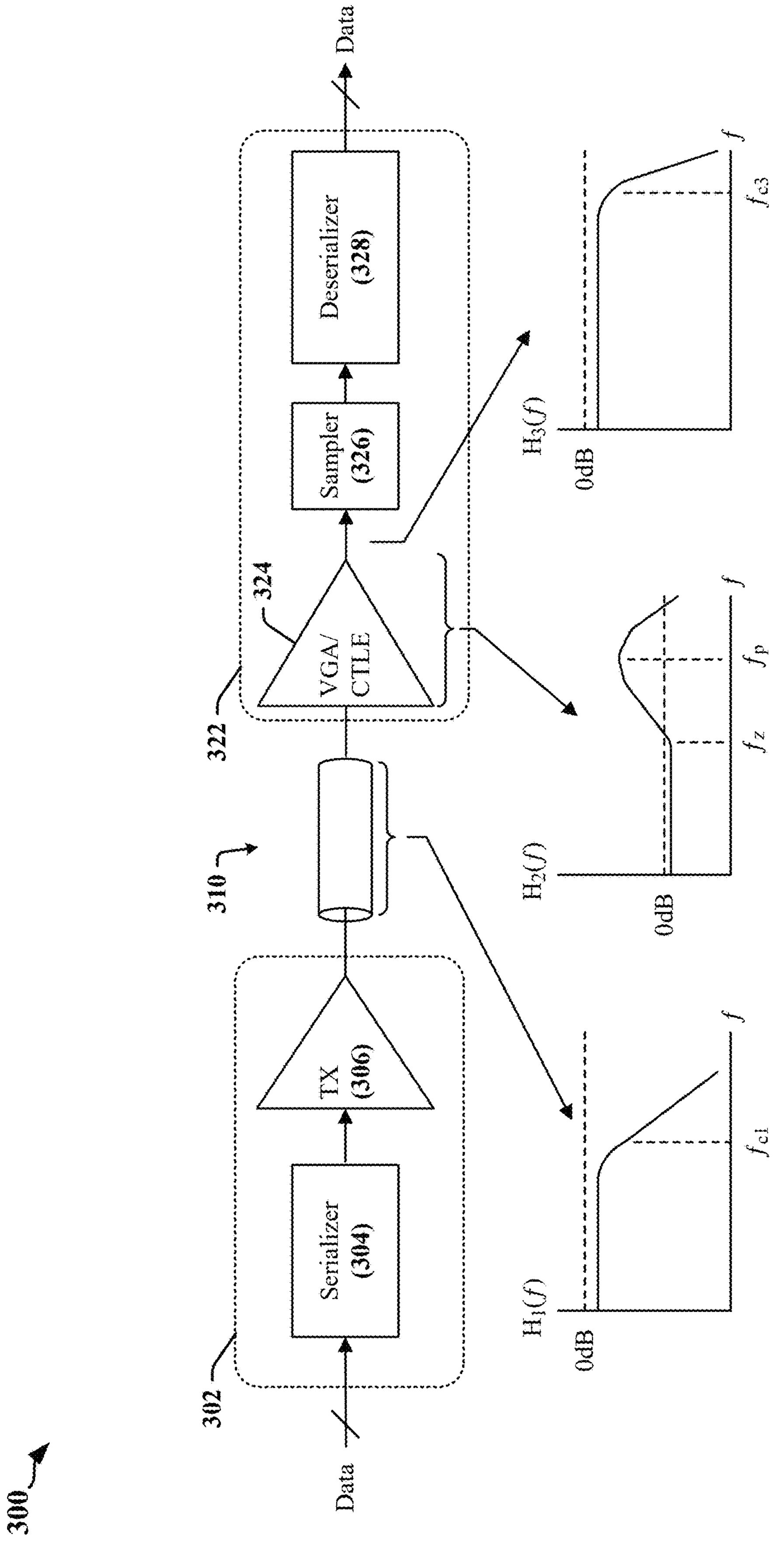
FIG. 3 illustrates an example of a data communication interface that may be adapted in accordance with certain aspects of the present disclosure.

FIG. 3 illustrates an example of a data communication system 300 that may be adapted in accordance with certain aspects of the present disclosure. The data communication system 300 includes a transmitter 302, a data communication channel 310, and a receiver 322. The transmitter 302 may be provided in a first device that is configured to transmit a data signal to a second device. The data communication channel 310 provides a transmission medium through which the data signal propagates from the first device to the second device. The receiver 322 may be provided in the second device and may be configured to receive and process the data signal.

In one example, the transmitter 302 includes a serializer 304 configured to convert parallel data into serial data. The transmitter 302 further includes a transmit driver 306 configured to generate a data signal based on the serial data for transmission to the receiver 322 through the data communication channel 310.

The data communication channel 310 may be implemented using any type of transmission medium by which a data signal can propagate from the transmitter 302 to the receiver 322. Examples of the data communication channel 310 includes one or more metallization traces (which may include one or more vias) on a printed circuit board (PCB), stripline, microstrip, coaxial cable, twisted pair, etc.

In the illustrated example, the receiver 322 includes a VGA with a continuous time linear equalizer (CTLE), a sampler circuit 326 and a deserializer 328. The combined VGA and CTLE circuit is referenced herein as the VGA/CTLE 324. Continuous time linear equalization may be configured to boost higher frequency components of a received data signal in order to bring all frequency components of the received data signal to a similar amplitude ratio before channel attenuation, improving jitter performance. As disclosed herein, the VGA/CTLE 324 is configured to perform equalization and amplification of the received data signal. The sampler circuit 326 is configured to recover data from the received data signal using timing information provided by a clock signal associated with the received data signal. The deserializer 328 is configured to convert the recovered data into parallel data.

The data communication channel 310 typically has a frequency response $H_1(f)$ that is similar to a low pass filter. For instance, the frequency response $H_1(f)$ has relatively low losses from direct current (DC) up to a particularly cutoff frequency $f_{c1}$; then the losses increase monotonically above the cutoff frequency $f_{c1}$. The frequency response $H_1(f)$ of the data communication channel 310 limits the data rate at which data may be sent through the channel. For example, the cutoff frequency $f_{c1}$ should be at least to the Nyquist rate of the data signal. If the Nyquist rate of the data signal is above the cutoff frequency $f_{c1}$, the data signal exhibits distortion at the receiver 322, which may make it difficult to recover the clock and the data by the sampler circuit 326.

The VGA/CTLE 324 may perform equalization and amplification to increase the high frequency components of the data signal in order to increase the data rate at which the data signal may be sent through the data communication cable and be reliably recovered at the receiver 322. For example, the VGA/CTLE 324 may be configured to provide a frequency response $H_2(f)$ that is substantially flat from DC up to a frequency $f_z$ corresponding to a Zero. Then, above the zero frequency $f_z$, the frequency response $H_2(f)$ of the VGA/CTLE 324 increases up to a frequency $f_p$ corresponding to a pole. Above the pole frequency $f_p$, the frequency response $H_2(f)$ of the VGA/CTLE 324 decreases monotonically. In some examples, the VGA/CTLE 324 may have more than one pole and one zero.

The VGA/CTLE 324 may be configured to have a frequency response $H_2(f)$ where the pole frequency $f_p$ substantially coincides with the cutoff frequency $f_{c1}$ of the frequency response $H_1(f)$ of the data communication channel 310. As the data communication channel 310 is cascaded with the VGA/CTLE 324, the frequency responses $H_1(f)$ and $H_2(f)$ of the data communication channel 310 and the VGA/CTLE 324 combine at the output of the VGA/CTLE 324 to form a composite frequency response $H_3(f)$. Thus, the high frequency boost at the pole frequency $f_p$ of the VGA/CTLE frequency response $H_2(f)$ compensates for the loss roll off at the cutoff frequency $f_{c1}$ of the channel frequency response $H_1(f)$ to generate the composite frequency response $H_3(f)$ having a cutoff frequency $f_{c3}$ much higher than the cutoff frequency $f_{c1}$ of the channel frequency response $H_1(f)$. Thus, through the use of the VGA/CTLE 324, much higher data rates between the transmitter 302 and receiver 322 may be realized.

In high-speed applications, data throughput of a serial data link may be limited by the characteristics of the channel used to carry data signals. Impedance mismatches, parasitic electromagnetic coupling and other factors can cause signal distortion. In various examples, one or more of the channels may be implemented using one or more metallization traces (which may include one or more vias) on a printed circuit board (PCB), stripline, microstrip, coaxial cable, twisted pairs of wires, etc. In many implementations, equalization circuits and capabilities are included in input/output (I/O) circuits to compensate for signal distortions attributable to inter-symbol interference (ISI) and other effects that can combine to limit bandwidth in a channel. ISI can result when a first-received symbol interferes with subsequently received symbols due to reflections, frequency-dependent delays and other imperfections in the channel. A symbol may refer to signaling state within a unit interval (UI), or symbol interval, in which data is modulated or encoded in the waveform of a transmitted signal. A decision-feedback equalizer (DFE) may be implemented in the receiver. The DFE is a nonlinear equalizer that is used in high-loss channels. The DFE can be configured to flatten channel response and limit signal distortion without introducing noise or crosstalk that can occur with equalizers that operate using amplification of received signals.

Certain aspects of this disclosure can optimize performance of a sampler in a high-frequency interface that includes a SERDES circuit. The example of a DFE is used herein to facilitate description of certain aspects of this disclosure. DFEs are nonlinear equalizer that are commonly used in serial links, including in high-speed SERDES circuits to flatten channel response and limit signal distortion. In certain examples, a DFE samples a received data signal to capture a time-series of bits that can be configured to cancel inter-symbol interference (ISI) in a current bit that is attributable to previous bits received in the received data signal. A summer and sampler may be provided in the DFE.

Figure 4:
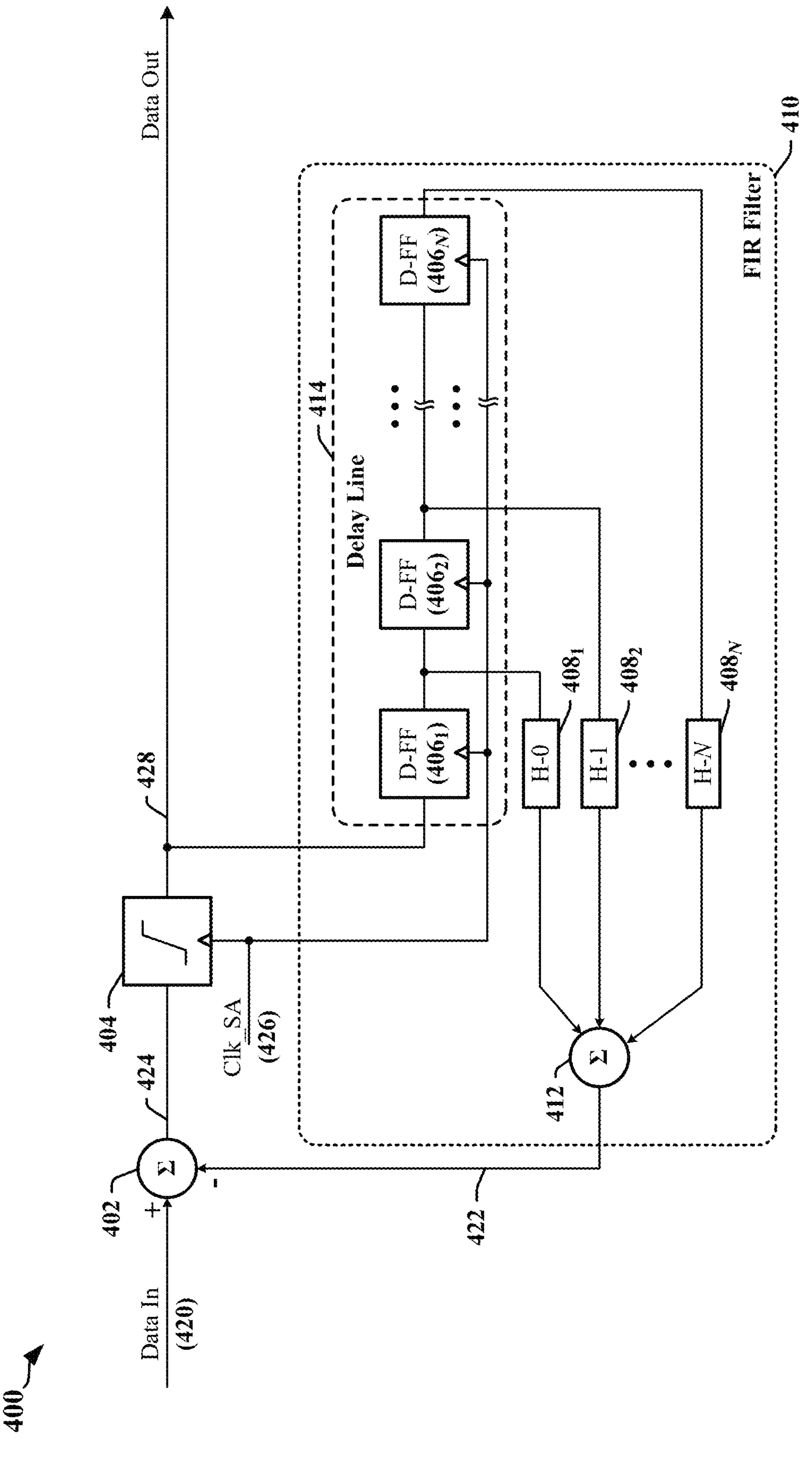
FIG. 4 illustrates a multi-tap decision-feedback equalizer that may be used in a data communication interface that can be adapted in accordance with certain aspects of this disclosure.

FIG. 4 provides an example of a conventional multi-tap DFE 400 that may be used in a data communication interface that can be adapted in accordance with certain aspects of this disclosure. For example, the presently disclosed techniques and circuits can accommodate or compensate for the effects of manufacturing process, voltage and/or temperature (PVT) variations on a sampler 404 and/or current summers 402, 412 provided within the DFE 400.

The current summer 402 may be configured to sum an input data signal 420 received from a communication link and a feedback signal 422 provided by a finite input response (FIR) filter 410. The output 424 of the current summer 402 is provided to a sampler 404, which may include or be implemented using a flipflop or latch that is clocked by a sampling clock signal (the CLK_SA signal 426), which may be derived from a clock signal corresponding to the input data signal 420. The CLK_SA signal 426 may be configured to capture data from a serial bus, for example. The sampler 404 may be referred to as a slicer that produces a sliced data signal 428 to an input to the FIR filter 410.

The illustrated FIR filter 410 includes a delay line 414 that can maintain the signaling state of the input data signal 420 in a number of previous transmission intervals. In one example, signaling state may be represented by a binary bit. In other examples, signaling state may be represented by a multibit binary number. In some examples, signaling state of a multibit input signal may be represented by a symbol. The output of the sampler 404 represents the current symbol value or signaling state of the channel in the current transmission interval. The current transmission interval may be referred to as the cursor. Outputs of the delay line 414 maintain representations of symbol value or signaling state of the channel in one or more post-cursor transmission intervals and may be used to cancel reflections and other post-cursor ISI affecting the channel in the current transmission interval. Weighted versions of the outputs of the delay line 414 may be used to subtract post-cursor ISI from the input data signal 420.

In the illustrated example, the sliced data signal 428 is used to drive the delay line 414. The delay line includes a number (N) of D-flipflops (D-FFs 406$_1$-406$_N$) clocked by the CLK_SA signal 426. Weight values can be applied to the outputs of the D-FFs 406$_1$-406$_N$. In the illustrated example, configurable weighted tap coefficients 408$_0$-408$_N$ are applied to the outputs of the D-FFs 406$_1$-406$_N$ in a feedback path that includes a current summer 412 that adds the weighted prior decisions to produce the feedback signal 422. In some implementations, current summer 402 may be used to sum the input data signal 420 and the weighted prior decisions.

In the illustrated example, the feedback signal 422 provides negative feedback. Magnitudes and polarities of the weighted tap coefficients 408$_0$-408$_N$ can be configured, calibrated or adjusted to compensate for channel characteristics. The multi-tap DFE 400 can be configured to cancel ISI attributable to previous bits received in the input data signal 420, enabling later-received bits to be sampled or detected by the sampler 404 with reduced bit error rate (BER). In some instances, the weighted tap coefficients 408$_0$-408$_N$ can be preconfigured by a designer or application. A controller may determine the value of the weights based on preconfigured information or information obtained from calibration or training. In some instances, the configuration, calibration, training or adjustment of the weighted tap coefficients 408$_0$-408$_N$ can be performed using an adaptive algorithm. In some implementations, the weighted tap coefficients 408$_0$-408$_N$ are applied to control current levels using a current digital-to-analog converter (IDAC) and/or a bias control circuit. The multi-tap DFE 400 is presented solely for the purpose of providing one example of the use of summers and samplers. Other types of circuit may include summers and samplers to perform functions other than DFE-related functions.

Figure 5:
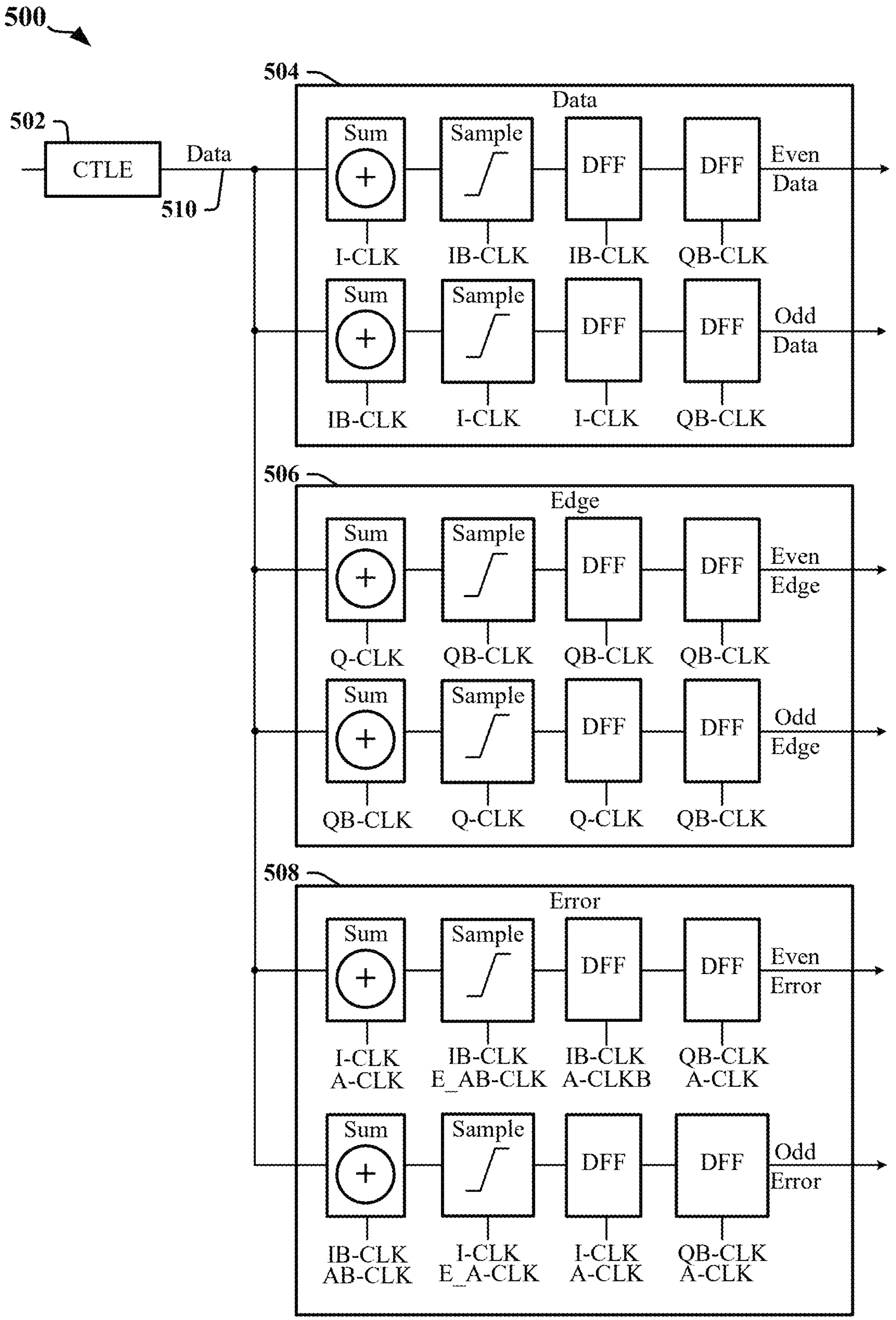
FIG. 5 illustrates a combination of decision-feedback equalizers that can be used to generate certain signals used for data and clock recovery in accordance with certain aspects of this disclosure.

FIG. 5 illustrates a combination of DFEs 500 that can be configured for different modes of operation in order to generate certain signals used for data and clock recovery in accordance with certain aspects of this disclosure. The summers, samplers and flipflops in the first DFE section 504 are clocked by versions of a clock signal, including in-phase (I-CLK), inverted in-phase (IB-CLK), quadrature (Q-CLK) and inverted quadrature (Q-CLKB) versions of the clock signal.

A first DFE section 504 includes even and odd DFE stages configured to capture data from a data signal 510 received from a CTLE 502. A second DFE section 506 includes even and odd DFE stages configured to detect even and odd edges in the data signal 510. A third DFE section 508 includes even and odd DFE stages configured to detect errors arising from the DFE configuration. The even and odd DFE stages respond to the data signal 510 and, in a first mode, the summers and flipflops are clocked by versions of the clock signal. In a second mode, the summers, the sampler and certain of the flipflops are clocked by versions of an auxiliary clock signal. In-phase (A-CLK) and inverted in-phase (AB-CLK) versions of the auxiliary clock signal are available. The auxiliary clock signal may be provided to improve data rates in some receivers. The auxiliary clock signal may be phase shifted with respect to the receive clock and phase shifted auxiliary clock signals (E_A-CL and E_AB-CLK) may enable signals to be sampled at the earliest or optimal time with respect to edges in the receive clock signal. In some examples, the auxiliary clock signal may be produced by a phase interpolator circuit.

Figure 6:
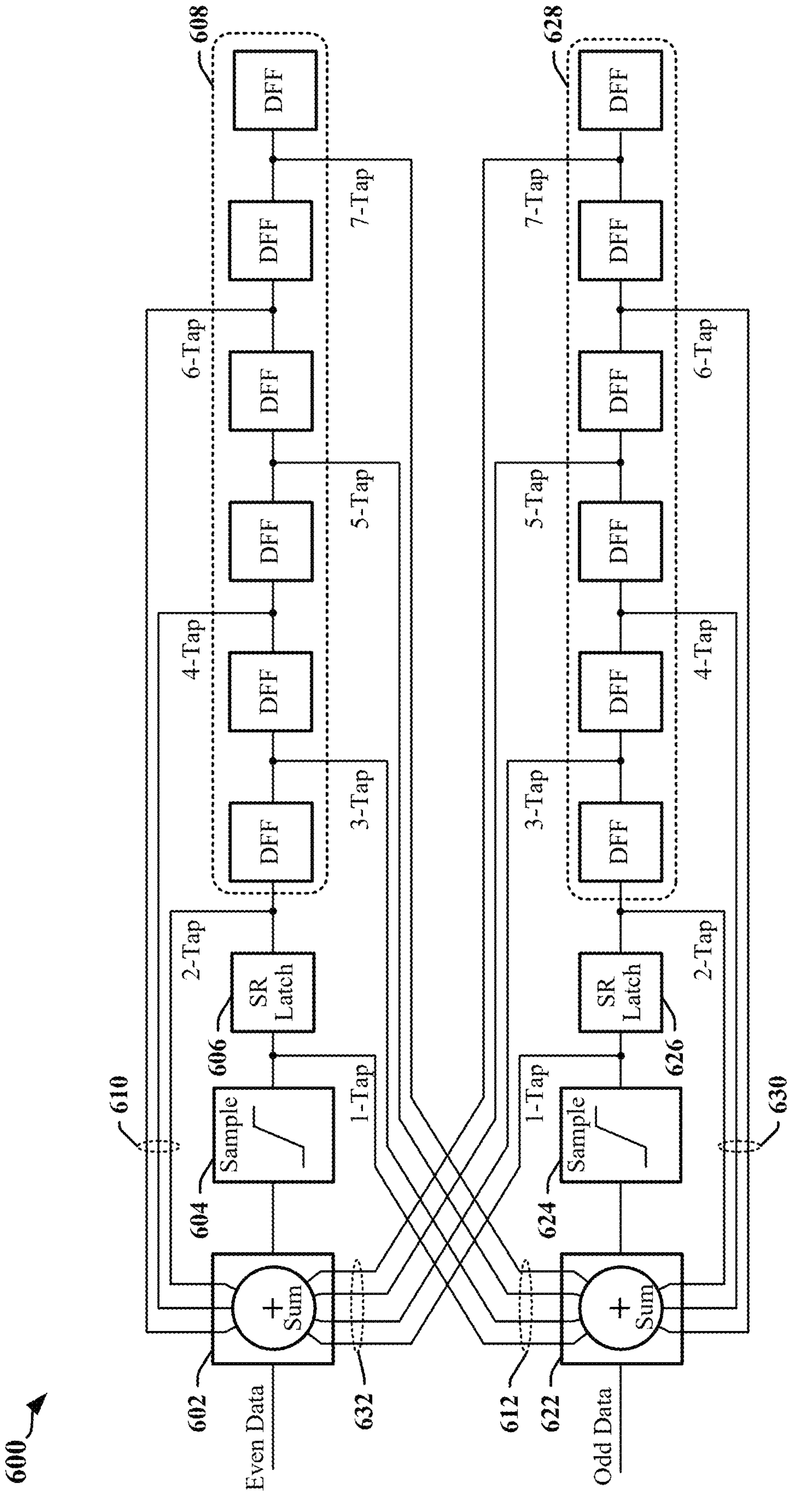
FIG. 6 illustrates an example of a current-integrating decision-feedback equalizer that may be adapted in accordance with certain aspects of this disclosure.

FIG. 6 illustrates an example of a current-integrating DFE 600. The current-integrating DFE 600 corresponds in some respects to the first DFE section 504 illustrated in FIG. 5, and shows certain features in more detail. In some implementations, the second DFE section 506 and third DFE section 508 may be implemented using the same circuit design used for the first DFE section 504.

The current-integrating DFE 600 includes even and odd paths for a data signal. Data bits received in a data signal are alternately processed by the even and odd paths. In certain implementations, the even path processes data bits that are identified using even numbers and the odd path processes data bits that are identified using odd numbers. An even number may be defined by the expression $Num_{even}=2i$, and an odd number may be defined by the expression $Num_{odd}=2i+1$, where i represents an integer value. Parallel data bits may be labeled according to position in a word (e.g., D0, D1, D2, . . . , D15), byte or other value. In this example, the even path of the DFE handles the even bits (D0, D2,D4, . . . , D14) of a serialized word and the odd path of the DFE handles the odd bits (D1, D3, D5, . . . , D15) of the serialized word.

In the illustrated example, an even path summer 602 adds currents representative of an input even data bit with weighted currents representative of feedback 610 received from the even path and weighted feedback 632 from the odd path. A sampler circuit 604 captures the output of the even path summer 602. A set-reset latch (i.e., the SR latch 606) captures and holds the output of sampler circuit 604 while the next even bit is being processed. The output of the SR latch 606 feeds series-connected D flipflops 608. The outputs of the SR latch 606, the sampler circuit 604 and the series-connected D flipflops 608 provide feedback 610, 612 that may be used by even path summer 602 or an odd path summer 622.

An odd path summer 622 adds currents representative of an input odd data bit with weighted currents representative of feedback 630 received from the odd path and weighted feedback 612 from the even path. A sampler circuit 624 captures the output of the odd path summer 622. A set-reset latch (i.e., the SR latch 626) captures and holds the output of sampler circuit 624 while the next odd bit is being processed. The output of the SR latch 626 feeds series-connected D flipflops 628. The outputs of the SR latch 626, the sampler circuit 624 and the series-connected D flipflops 628 provide feedback 630, 632 that may be used by even path summer 602 or odd path summer 622.

Figure 7:
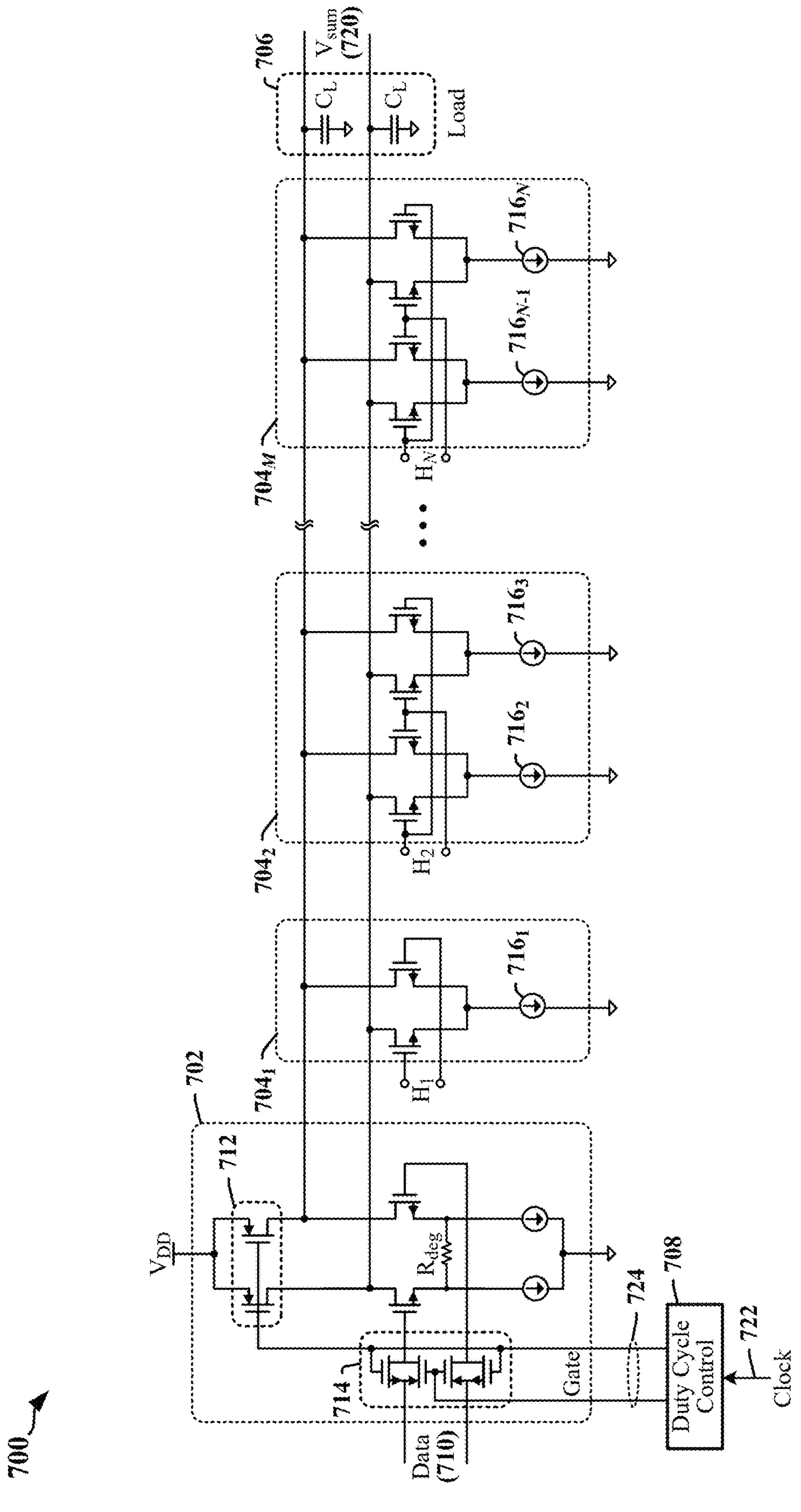
FIG. 7 illustrates an example of a current integrating summer and sampler that may be adapted for use in a decision-feedback equalizer configured in accordance with certain aspects of this disclosure.

FIG. 7 illustrates an example of a current integrating summer and sampler 700 that may be adapted for use in a DFE configured in accordance with certain aspects of this disclosure. A gating circuit 702 includes a pair of transistors 712 and a pass gate circuit 714 that cooperate to couple an input data signal 710 to a current summer and to enable summing when a gating clock signal 724 is in a first signaling state (e.g., a higher voltage corresponding to logic 1). For the purposes of this disclosure, a unit of time referred to herein as the unit interval (UI) is defined such that the data signal encodes a single data bit in each UI. The duration of the UI may correspond to or be defined by the period of a data clock signal. The frequency of the illustrated gating clock signal 724 is half the frequency of the data clock signal. In the illustrated example, a differential version of the gating clock signal 724 is provided to a differential clock input of the gating circuit 702. In other examples, a single ended version of the gating clock signal 724 is provided to the gating circuit 702. The gating clock signal 724 may be provided by a duty cycle correction circuit 708. The duty cycle correction circuit 708 may be configured to adjust, control or maintain the duty cycle of the gating clock signal 724. Typically, the duty cycle correction circuit 708 is adapted or configured to provide the gating clock signal 724 with a 50% duty cycle. In a conventional dual-path system, a 50% duty cycle maximizes the sampling and summing intervals for both the even path and the odd path.

The current integrating summer and sampler 700 performs current summing by combining currents that are generated by weighted taps $\mathbf{704}_1$-$\mathbf{704}_M$. Each tap $\mathbf{704}_1$-$\mathbf{704}_M$ is weighted based on the amplitude of a current produced by corresponding current sources $\mathbf{716}_1$-$\mathbf{716}_M$. In some implementations, the current sources $\mathbf{716}_1$-$\mathbf{716}_M$ may be calibrated during system calibration, initialization or in response to changes in channel conditions. Each tap $\mathbf{704}_1$-$\mathbf{704}_M$ receives a feedback signal (here, the differential signals $H_1$-$H_N$), which may be characterized or referred to as tap coefficients. The summed current flows through a load provided by a combination of resistance (R) provided by the transistors 712 and load capacitances 706 (C), which can impact the rise time and/or the settling time of transitions in data signals due to the resultant RC time constant.

Figure 8:
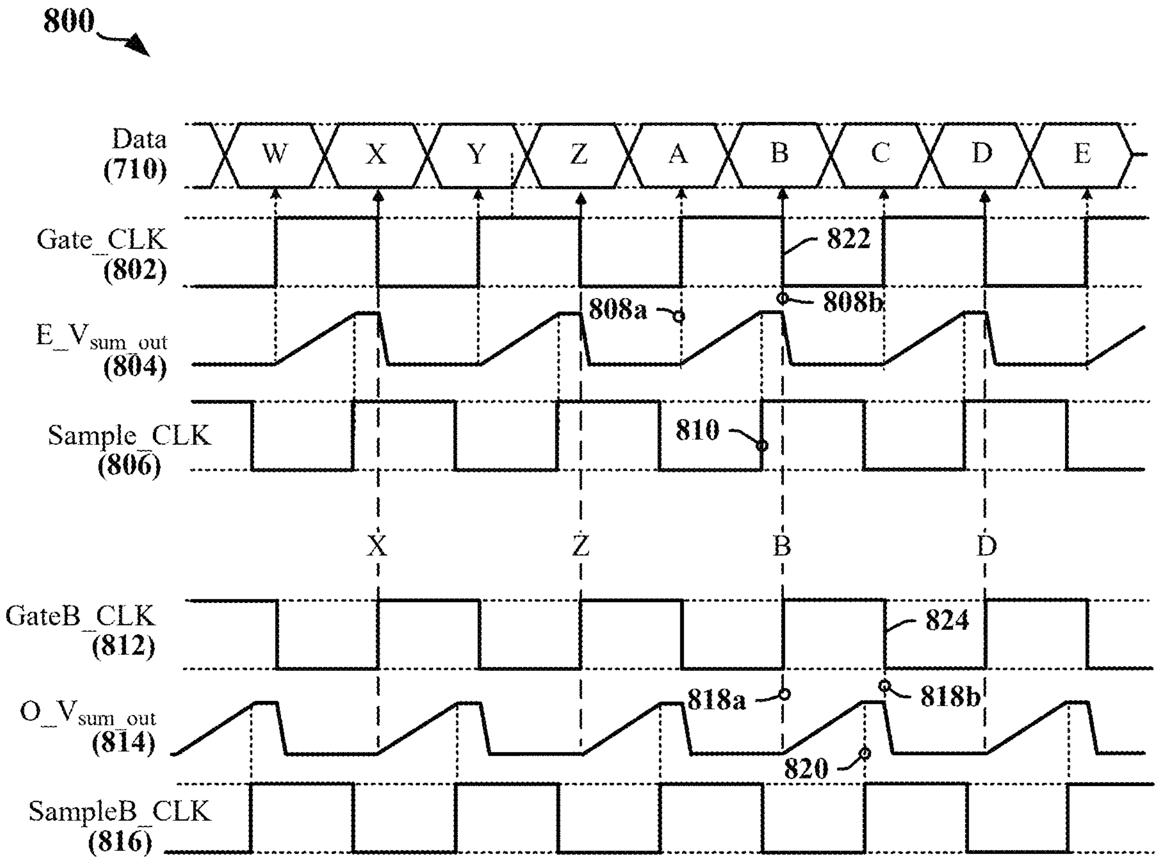
FIG. 8 is a timing diagram that illustrates certain aspects of the current integrating summer and sampler illustrated in FIG. 7
Figure 8:
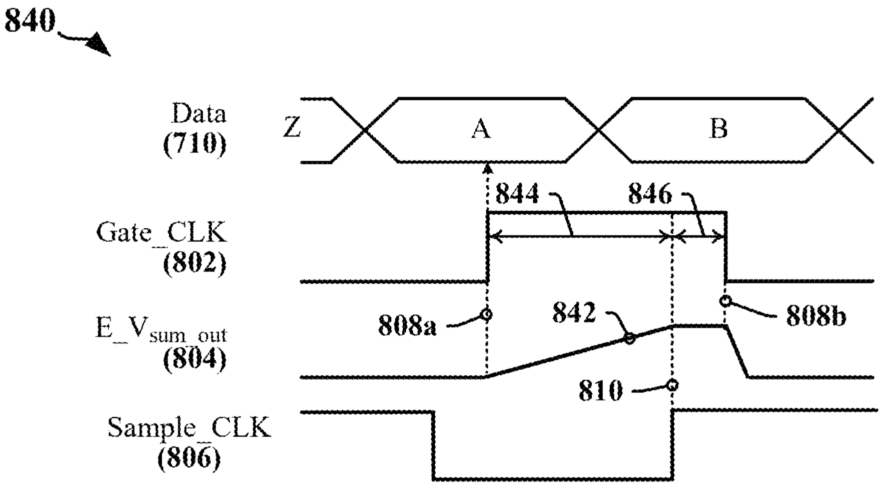

FIG. 8 includes a timing diagram 800 that illustrates certain aspects of the current integrating summer and sampler 700 illustrated in FIG. 7. The timing diagram 800 relates in some respects to the current-integrating DFE 600 illustrated in FIG. 6 and depicts examples of timing in the even and odd paths for a data signal. In conventional systems, the implementation of even and odd paths enables the DFE 600 to operate at higher data rates by providing additional time for the summer to integrate the currents produced by the taps $\mathbf{704}_1$-$\mathbf{704}_M$ of the DFE. In a conventional dual-path system, the gating clock signal 724 is provided to either the even or odd path and an inverted version of the gating clock signal 724 is provided to the other path. The outputs of the even and odd summers (e.g., $V_{sum}$ 720) are captured by sampling circuits (e.g., the sampler circuits 604, 624 in FIG. 6) which are clocked using complementary versions of a sampling clock signal.

The relationship between odd and even path timing is illustrated in the timing diagram 800. The use of complementary gating clock signals 802, 812 and of sampling clock signals 806, 816 can be seen in the timing diagram 800. In the illustrated example, the sampling clock signals 806, 816 are half-rate clock signals, having a period that is twice the duration of the UI in which a data bit can be encoded in the data signal 710. In other words, the frequency of the sampling clock signals 806, 816 is half the frequency of the data clock signal used to transmit or receive bits of data over a communication link.

In the illustrated example, the gating circuit (cf. the gating circuit 702) in the even path is enabled at a first point in time 808*a* and disabled at a second point in time 808*b*. The even summer integrates currents between the first point in time 808*a* and the second point in time 808*b* and the output of the even summer (i.e., E_Vsum_out 804) is captured at an edge in the even sampling clock 806, that begins at a third point in time 810. E_Vsum_out 804 is expected to have crossed a switching threshold by the third point in time 810 after a transition in the signaling state of the data signal 710 has occurred. The even summer is expected to maintain signaling state of E_Vsum_out 804 for a minimum hold time specified for the even sampling circuit. The signaling state of a signal at the input to a latch, flipflop or other type of sequential logic is expected to be maintained for a nominal minimum hold time to ensure reliable operation of the sequential logic circuit capture of the signaling state of E_Vsum_out 804.

In the illustrated example, the second point in time 808*b* corresponds to a fourth point in time 818*a* at which the gating circuit in the odd path is enabled. The gating circuit in the odd path is disabled at a fifth point in time 818*b*. The odd summer integrates currents between the fourth point in time 818*a* fourth and the fifth point in time 818*b* and the output of the odd summer (i.e., O_Vsum_out 814) is captured at an edge in the odd sampling clock 816 that begins at the sixth point in time 820. O_Vsum_out 814 is expected to have crossed a switching threshold by the sixth point in time 820 when a transition in the signaling state of the data signal 710 has occurred. The odd summer is expected to maintain signaling state of O_Vsum_out 814 for a nominal minimum hold time specified for the odd sampling circuit.

The timing diagram 840 in FIG. 8 illustrates certain aspects of the timing of data capture in a dual-path system. The gating circuit in the even path is enabled at the first point in time 808*a* and disabled at the second point in time 808*b*. The even summer integrates currents for the duration 844 between the first point in time 808*a* and second point in time 808 *b*. E_Vsum_out 804 rises with a slope 842 determined by the summed currents, the load and the RC constant associated with the even path. The current can vary based on weighting value and weighting coefficients. The signaling state of E_Vsum_out 804 is captured based on an edge in the even sampling clock 806, that begins at the third point in time 810. In one example, the signaling state of E_Vsum_out 804 is compared to a switching threshold voltage level to determine an encoded logic state. The even summer is expected to maintain signaling state of E_Vsum_out 804 for a duration 846 that is no less than the minimum hold time specified for the even sampling circuit.

The maximum frequency of the gating signals used in conventional systems is limited by maximum of the sum of the minimum hold time and the time required for the summer output to reach a switching threshold. In many conventional systems, the maximum frequency of the gating clock signals is calculated based on a gating clock signal with a 50% duty cycle. In some implementations, a duty cycle correction circuit is used to generate a gating clock signal with a 50% duty cycle. The gating clock signal can be time or phase shifted to obtain a sampling clock that also has a 50% duty cycle. The duty cycle correction circuit can be configured to ensure that the duration between rising edges and subsequent falling edges in a corrected clock signal is substantially the same (i.e., within predefined tolerances) as the duration between falling edges and subsequent rising edges in the corrected clock signal. In some implementations, a divider circuit may be configured to control the duty cycle. The duty cycle correction circuit can maximize the operational frequency of the summing and sampling circuits in a dual path DFE, which can be defined based on the nominal minimum hold time and the transition time in the summer outputs for the shortest duration of enablement of the even and odd gating circuits.

Certain aspects of this disclosure can increase the maximum operational frequency and sensitivity of a dual path DFE, and can provide optimized data throughput for a high-speed communication link. In one aspect, maximum operational frequency can be increased by increasing the summer integration time. In some implementations, summer integration time can be increased by borrowing time from the integration summer reset period. The integration summer reset period may be defined as the time immediately following the falling edges 822, 824 in the gating clock signals 802, 812 (see FIG. 8).

In a DFE that has been adapted or configured in accordance with certain aspects of this disclosure, summer integration time can be increased to obtain sufficient summer gain by modifying or distorting the duty cycle of gating clock signals. Increased gains of at least 1 dB can be expected, and such level of increase can limit signal attenuation within the DFE. Adjustment of the duty cycle of the gating clock signals may increase the hold time of signals to be captured by sequential logic circuits in the samplers used by the DFE, and in particular in the first stage samplers that sense data input signals.

In one example, certain aspects of this disclosure are applicable to DFEs used in an interface that is operated at 32 Gigabit per second (Gbps) in accordance with PCIe specifications. In PCIe-5 specifications, for example, the UI has a duration of 31.25 picoseconds and, according to one aspect of this disclosure, the duty cycle of the gating clock signals can be adjusted sufficiently to avoid a quick reset and to optimize the tradeoff between sensitivity and hold time.

In certain implementations, duty cycle control circuits may be used to introduce duty cycle distortion in one or more control signals. In one example, the duty cycle control circuit can be adapted to provide gating control signals with a duty cycle that is greater than 50% to a gating circuit such that more time is available to capture the output of a summing circuit coupled to the gating circuit. The gating control signals provided to each path in a multi-path DFE may have a relationship that is other than an inverse or complementary relationship. In some implementations, the gating control signals may be phase shifted and have overlapping pulses. For example, gating control signals in a dual path DFE may be shifted by 180° with respect to one another.

Figure 9:
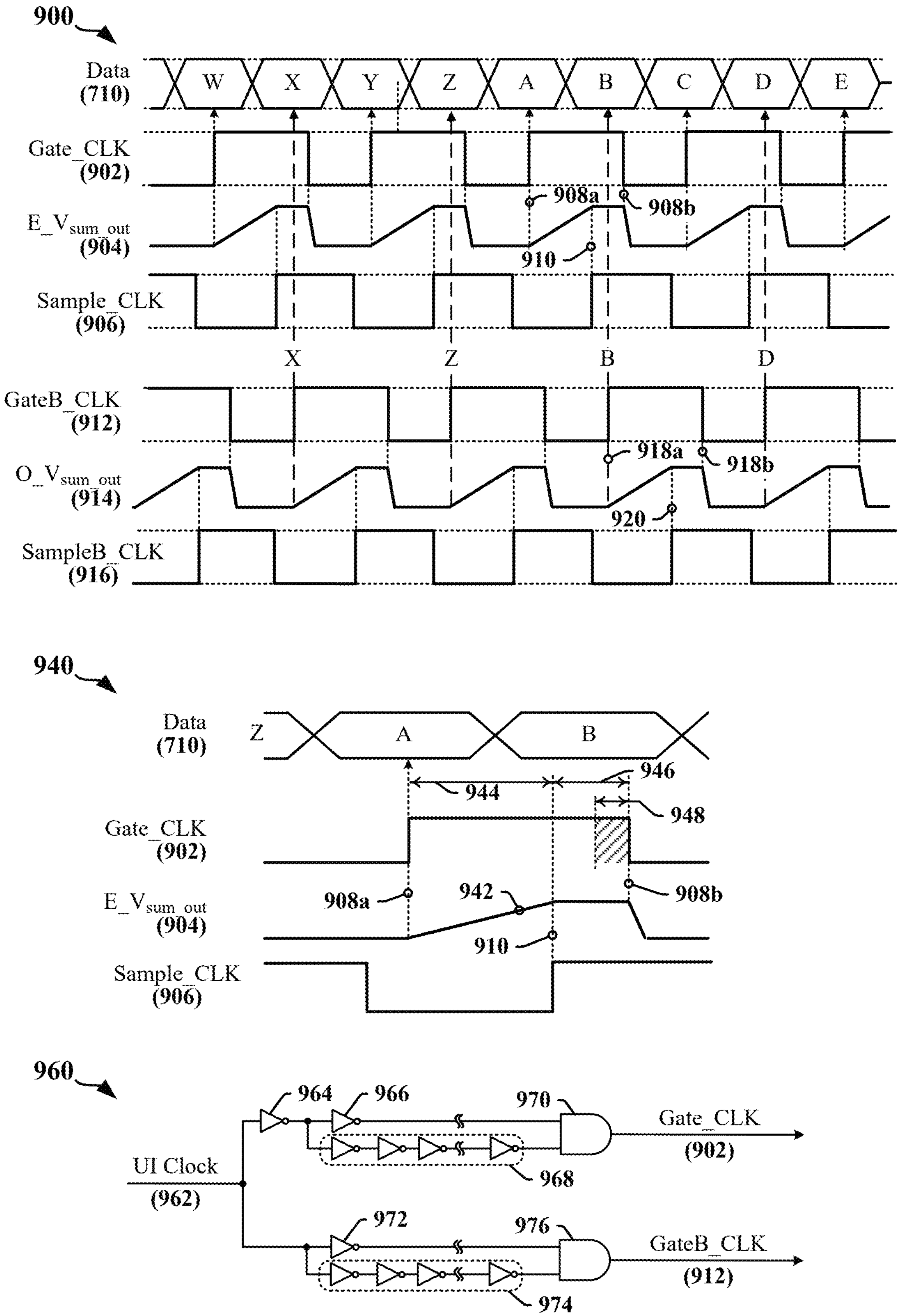
FIG. 9 includes a timing diagram that illustrates certain aspects of the operation of a current integrating summer and sampler that has been adapted in accordance with certain aspects of this disclosure.

FIG. 9 includes a timing diagram 900 that illustrates certain aspects of the operation of a current integrating summer and sampler that has been adapted in accordance with certain aspects of this disclosure. In one example, the current integrating summer and sampler 700 illustrated in FIG. 7 may be adapted by augmenting, reconfiguring or replacing the duty cycle correction circuit 708 in order to intentionally distort the duty cycle of the gating clock signal 724. In some implementations, gating control signals for a multi-path DFE may be configured with duty cycles that exceed 50%. The timing diagram 900 relates in some respects to the current-integrating DFE 600 illustrated in FIG. 6 and depicts examples of timing in the even and odd paths for a data signal. The even and odd paths can enable the DFE 600 to operate at higher data rates by providing additional time for the summer to integrate the currents produced by the taps $\mathbf{704_1}$-$\mathbf{704_M}$ of the DFE. According to one aspect of this disclosure, the gating control signals may be configured to increase the percentage of time that the corresponding gating circuits are enabled.

The relationship between odd and even path timing is illustrated in the timing diagram 900. In the illustrated example, the odd gating clock signal 912 is phase shifted by 180° with respect to the even gating clock signal 902. The odd sampling clock signal 916 is an inverted version of the even sampling clock signal 906. In the illustrated example, the sampling clock signals 906, 916 are half-rate clock signals, having a period that is twice the duration of the UI in which a data bit can be encoded in the data signal 710. The frequency of the sampling clock signals 906, 916 is half the frequency of the data clock signal used to transmit or receive bits of data over a communication link.

In the illustrated example, the gating circuit (cf. the gating circuit 702) in the even path is enabled at a first point in time 908*a* and disabled at a second point in time 908*b*. The even summer integrates currents between the first point in time 908*a* and the second point in time 908*b* and the output of the even summer (i.e., E_Vsum_out 904) is captured by an edge in the even sampling clock 906, that begins at a third point in time 910. E_Vsum_out 904 is expected to have crossed a switching threshold by the third point in time 910 when a transition in the signaling state of the data signal 710 has occurred.

The modified duty cycle for the even gating clock signal 902 enables the even summer to extend the hold time for E_Vsum_out 904 by a duration of time that can be configured by a duty cycle control circuit. The extended hold time for E_Vsum_out 904 may increase the maximum frequency of operation of the current integrating summer and sampler and the DFE in which it is embodied. In one example, the duty cycle of the even gating clock signal 902 may be distorted by including additional inverters or buffers in a clock generation circuit that provides the even gating clock signal 902. In some implementations, the clock generation circuit may include a delay locked loop and the number of inverters or buffers used to define the active signaling state (e.g., the signaling state represented by a higher voltage) may be greater than the number of inverters or buffers used to define the inactive (e.g., the signaling state represented by a lower voltage). In the example of a PCIe interface that operates at 32 Gbps, a difference of two or three inverters or buffers may be sufficient to obtain a desired duty cycle distortion.

In the timing diagram 900, the second point in time 908*b* corresponds to a fourth point in time 918*a* at which the gating circuit in the odd path is enabled. The gating circuit in the odd path is disabled at a fifth point in time 918*b*. The odd summer integrates currents between the fourth point in time 918*a* fourth and the fifth point in time 918*b* and the output of the odd summer (i.e., O_Vsum_out 914) is captured by an edge in the odd sampling clock 916, that begins at the sixth point in time 920. O_Vsum_out 914 is expected to have crossed a switching threshold by the sixth point in time 920 when a transition in the signaling state of the data signal 710 has occurred.

The modified duty cycle for the odd gating clock signal 912 enables the odd summer to extend the hold time for O_Vsum_out 914 by a duration of time that can be configured by a duty cycle control circuit. The extended hold time for O_Vsum_out 914 may increase the maximum frequency of operation of the current integrating summer and sampler and the DFE in which it is embodied. In one example, the duty cycle of the odd gating clock signal 912 may be distorted by including additional inverters or buffers in the clock generation circuit that provides the odd gating clock signal 912. In some implementations, the clock generation circuit may include a delay locked loop and the number of inverters or buffers used to define the active signaling state (e.g., the signaling state represented by a higher voltage) may be greater than the number of inverters or buffers used to define the inactive (e.g., the signaling state represented by a lower voltage). In the example of a PCIe interface that operates at 32 Gbps, a difference of two or three inverters or buffers may be sufficient to obtain a desired duty cycle distortion The timing diagram 940 in FIG. 9 illustrates certain aspects of the timing of data capture in a dual-path system. The gating circuit in the even path is enabled at the first point in time 908*a* and disabled at the second point in time 908*b*. The even summer integrates currents for the duration 944 between the first point in time 908*a* and second point in time 908 *b*. E_Vsum_out 904 rises with a slope 942 determined by the summed currents, the load and the RC constant associated with the even path. The current can vary based on weighting value and weighting coefficients. The signaling state of E_Vsum_out 904 is captured based on an edge in the even sampling clock 906, that begins at the third point in time 910. In one example, the signaling state of E_Vsum_out 904 is compared to a switching threshold voltage level to determine an encoded logic state.

The modified duty cycle for the even gating clock signal 902 enables the even summer to extend the hold time 946 for E_Vsum_out 904 by a duration of time 948 that can be configured by a duty cycle control circuit. The extended hold time 946 for E_Vsum_out 904 may increase the sensitivity and maximum frequency of operation of the current integrating summer and sampler and the DFE in which it is embodied. In one example, the duty cycle of the even gating clock signal 902 may be distorted by including additional inverters or buffers in the clock generation circuit that provides the even gating clock signal 902. In some implementations, the clock generation circuit may include a delay locked loop and the number of inverters or buffers used to define the active signaling state (e.g., the signaling state represented by a higher voltage) may be greater than the number of inverters or buffers used to define the inactive (e.g., the signaling state represented by a lower voltage). In the example of a PCIe interface that operates at 32 Gbps, a difference of two or three inverters or buffers may be sufficient to obtain a desired duty cycle distortion.

With continued reference to FIG. 7 and in some implementations, the duty cycle correction circuit 708 may include a pulse generating circuit that generates a pulse in response to an edge in a base clock signal 722. In some implementations, the base clock signal 722 has a frequency that is greater than the frequency of the gating clock signal 724. In one example, the pulse generating circuit may respond to transitions from a lower voltage signaling state to a higher voltage signaling state in the base clock signal 722. In another example, the pulse generating circuit may respond to transitions from the higher voltage signaling state to the lower voltage signaling state in the base clock signal 722. The pulse generating circuit may generate a pulse with configurable duration. In certain examples, the pulse generating circuit can be implemented using one or more counters or flipflops that are clocked by the base clock signal 722.

FIG. 9 includes an example of a pulse generating circuit 960 that may be configured to produce the gating clock signals 902 and 912. The pulse generating circuit 960 is provided to illustrate certain concepts disclosed herein, and is but of many circuits that could be used to generate the gating clock signals 902 and 912. In the illustrated example, a half-rate unit interval (UI) clock signal 962 is received. The term "half-rate clock signal" as used herein refers to a clock signal with a frequency that corresponds to half the rate at which serial data in is received at the DFE. For the purposes of this disclosure, each bit of data is transmitted a unit interval (UI), or symbol interval, in which data is modulated or encoded in the waveform of a transmitted signal. In some implementations, the half-rate UI clock signal 962 is received from a duty cycle correction circuit, such as the duty cycle correction circuit 708 in the current integrating summer and sampler 700 illustrated in FIG. 7.

The UI clock signal 962 is propagated through an even number of inverters to a first terminal of AND gate 970 that outputs gating clock signal 902. The even number of inverters includes inverters 964 and 966. A transition from a lower voltage signaling state to a higher voltage signaling state in the UI clock signal 962 causes the first terminal of AND gate 970 to transition from the lower voltage signaling state to the higher voltage signaling state after a propagation delay attributable to the inverters that include inverters 964 and 966. The UI clock signal 962 is further propagated through an odd number of inverters to a second terminal of AND gate 970, the odd number of inverters including inverters 964 and a series of inverters 968. The number of inverters that contribute to the propagation delay through the series of inverters 968 may be configured by bypassing one or more inverters using a switching transistor, for example. The transition from the lower voltage signaling state to the higher voltage signaling state in the UI clock signal 962 causes the second terminal of AND gate 970 to transition from the higher voltage signaling state to the lower voltage signaling state after a propagation delay attributable primarily to the series of inverters 968. Transitions from the higher voltage signaling state to the lower voltage signaling state in the UI clock signal 962 are propagated through AND gate 970 after the propagation delay attributable to the inverters that include inverters 964 and 966. Accordingly, gating clock signal 902 is at the higher signaling state for a longer duration than in the lower signaling state, provided the series of inverters 968 includes more inverters that the inverters coupled to the first terminal of AND gate 970.

The UI clock signal 962 is propagated through an odd number of inverters to a first terminal of AND gate 976 that outputs gating clock signal 912. The odd number of inverters includes inverter 972. A transition from the higher voltage signaling state to the higher voltage signaling state in the UI clock signal 962 causes the first terminal of AND gate 976 to transition from the lower voltage signaling state to the higher voltage signaling state after a propagation delay attributable to the inverters that include inverter 972. The UI clock signal 962 is further propagated through an even number of inverters to a second terminal of AND gate 976, the even number of inverters including a series of inverters 974. The series of inverters 974 may be configured by bypassing one or more inverters using a switching transistor, for example. The transition from the higher voltage signaling state to the lower voltage signaling state in the UI clock signal 962 causes the second terminal of AND gate 976 to transition from the higher voltage signaling state to the lower voltage signaling state after a propagation delay attributable to the series of inverters 974. Transitions from the higher voltage signaling state to the lower voltage signaling state in the UI clock signal 962 are propagated through AND gate 976 after the propagation delay attributable to the inverters that include inverter 972. Accordingly, gating clock signal 912 is at the higher signaling state for a longer duration than in the lower signaling state, provided the series of inverters 974 includes more inverters that the inverters coupled to the first terminal of AND gate 976.

Figure 10:
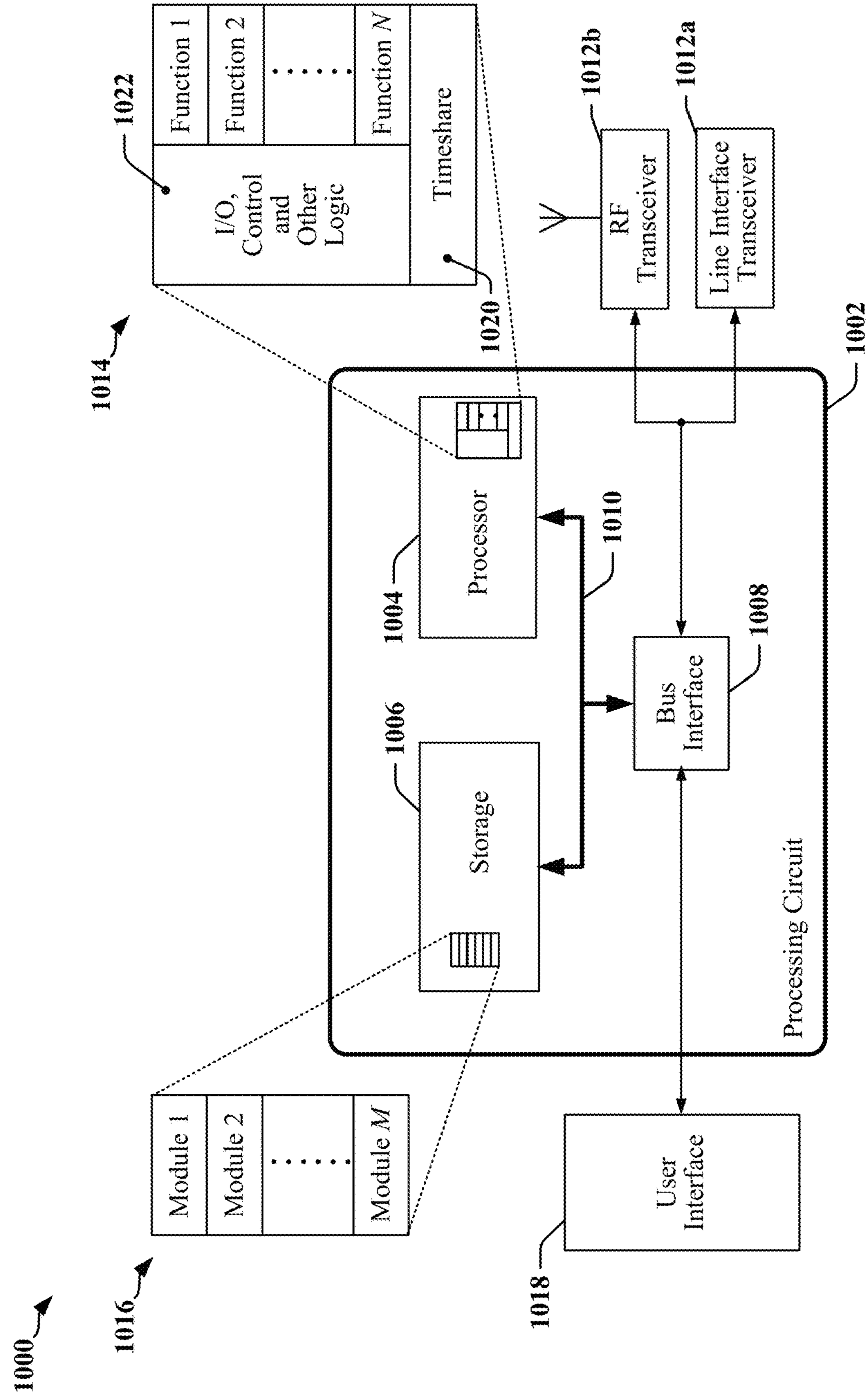
FIG. 10 illustrates one example of an apparatus employing a processing circuit that may be adapted according to certain aspects disclosed herein.

FIG. 10 is a diagram illustrating an example of a hardware implementation for an apparatus 1000. In some examples, the apparatus 1000 may perform one or more functions disclosed herein. In accordance with various aspects of the disclosure, an element, or any portion of an element, or any combination of elements as disclosed herein may be implemented using a processing circuit 1002. The processing circuit 1002 may include one or more processors 1004 that are controlled by some combination of hardware and software modules. Examples of processors 1004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012*a*, 1012*b*. A transceiver 1012*a*, 1012*b* may be provided for each networking technology supported by the processing circuit. In some instances, multiple networking technologies may share some or all of the circuitry or processing modules found in a transceiver 1012*a*, 1012*b*. Each transceiver 1012*a*, 1012*b* provides a means for communicating with various other apparatus over a transmission medium. In one example, a transceiver 1012*a* may be used to couple the apparatus 1000 to a multi-wire bus. In another example, a transceiver 1012*b* may be used to connect the apparatus 1000 to a radio access network. Depending upon the nature of the apparatus 1000, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement certain methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer-readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as a transceiver 1012*a*, 1012*b*, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to a transceiver 1012*a*, 1012*b*, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012*a*, 1012*b*, and device drivers, for example. To support the performance of multiple functions, the one or more processors 1004 may be configured to provide a multitasking environment, whereby each of a plurality of functions is implemented as a set of tasks in a corresponding context that is serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit operates in a corresponding context and is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

In one example, the processing circuit 1002 may be used to implement an equalizing circuit in a receiving device. The equalizing circuit may include a first current summer and a first sampler. The first current summer may be configured to sum currents representative of a data signal and a first plurality of feedback signals when enabled by a first control signal. The first current summer may be enabled when the first control signal is in a first signaling state and disabled when the control signal is in a first signaling state. The first sampler may be configured to sample an output of the first current summer in accordance with timing provided by a first sampling clock signal. The first control signal may be in the first signaling state for a duration that is longer than a unit interval that defines the interval in which a bit of data is encoded in the data signal.

In some implementations, the first control signal has a period that is twice the duration of one unit interval. The equalizing circuit may further include a first duty cycle control circuit adapted to configure a duty cycle greater than 50% for the first control signal. The first sampler may be configured to sample signaling state at the output of the first current summer at an edge in the first sampling clock signal and while the first control signal is in the first signaling state.

In certain implementations, the equalizing circuit further includes a second current summer and a second sampler. The second current summer may be configured to sum currents representative of the data signal and a second plurality of feedback signals when enabled by a second control signal. The second current summer may be enabled when the second control signal is in the first signaling state and disabled when the control signal is in the first signaling state. The second sampler may be configured to sample an output of the second current summer in accordance with timing provided by a second sampling clock signal. The second control signal may be in the first signaling state for a duration that is longer than one unit interval. The second control signal have a period that is twice the duration of a unit interval. The equalizing circuit may further include a second duty cycle control circuit adapted to configure a duty cycle greater than 50% for the second control signal. The second sampler may be configured to sample signaling state at the output of the second current summer at an edge in the second sampling clock signal and while the second control signal is in the first signaling state.

In some implementations, the second control signal may be a phase shifted version of the first control signal. The second sampling clock signal may be an inverted version of the first sampling clock signal. The first plurality of feedback signals includes delayed versions of the output of the first sampler and delayed versions of the output of the second sampler. The second plurality of feedback signals may include delayed versions of the output of the second sampler and delayed versions of the output of the first sampler.

Figure 11:
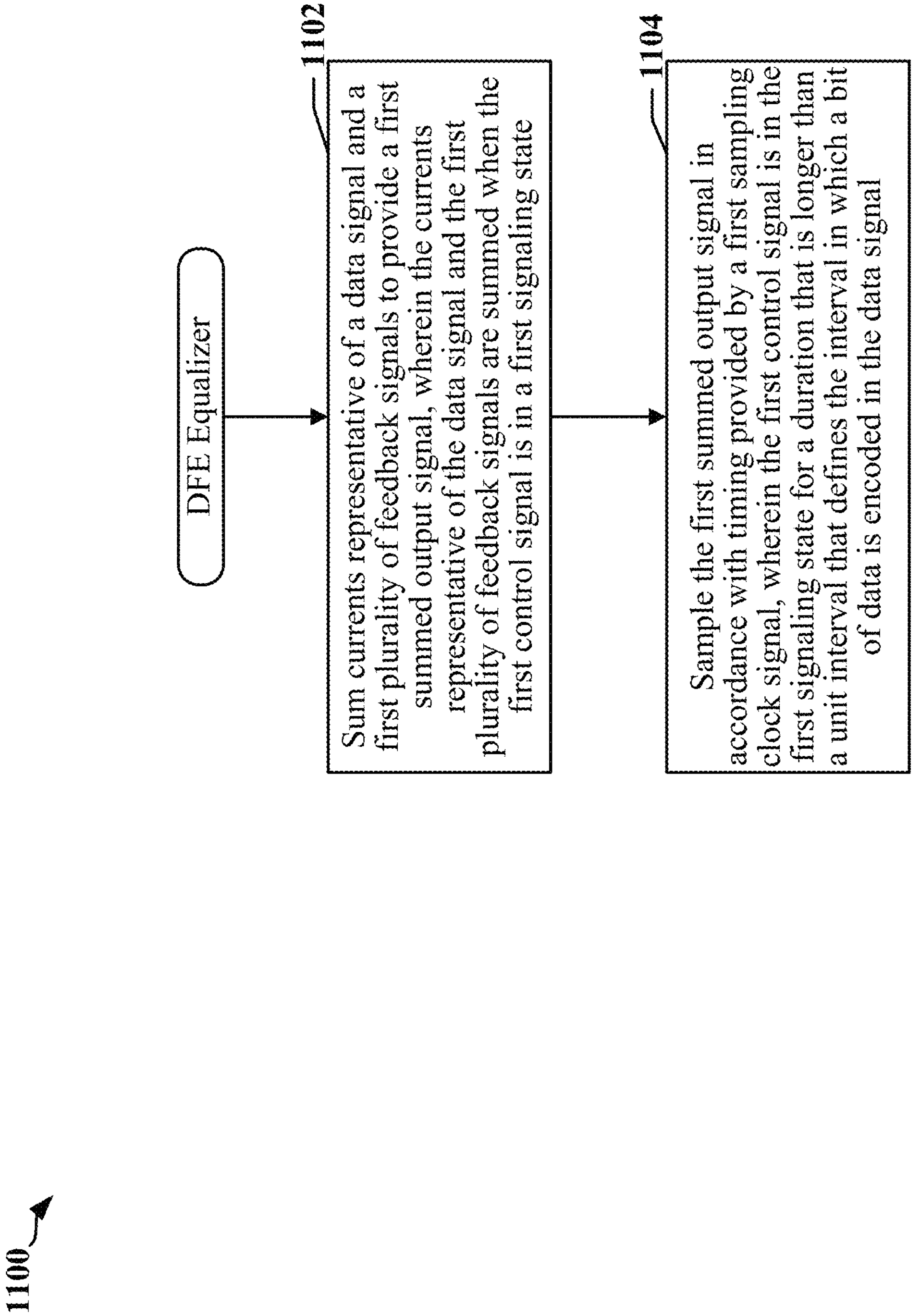
FIG. 11 is a flow diagram illustrating an example of a method for equalizing a data signal received from a serial data link according to certain aspects disclosed herein.

FIG. 11 is a flow diagram illustrating an example of a method 1100 for equalizing a data signal received over a serial data link. In one example, the method 1100 may be performed in one of the DFEs illustrated in FIGS. 4-6. For example, the method 1100 may be performed in a receiver that includes a multi-tap DFE, two slicers and two summers.

At block 1102, currents representative of a data signal and a first plurality of feedback signals may be summed to provide a first summed output signal. The currents representative of the data signal and the first plurality of feedback signals may be summed when the first control signal is in a first signaling state.

At block 1104, the first summed output signal may be sampled in accordance with timing provided by a first sampling clock signal. The first control signal may be in the first signaling state for a duration that is longer than a unit interval that defines the interval in which a bit of data is encoded in the data signal.

In some implementations, currents representative of the data signal and a second plurality of feedback signals may be summed to provide a second summed output signal. The currents representative of the data signal and the second plurality of feedback signals may be summed when the second control signal is in the first signaling state. The second summed output signal may be sampled in accordance with timing provided by a second sampling clock signal. The second control signal may be in the first signaling state for a duration that is longer than one unit interval. In one example, each of the first control signal and the second control signal has a period that is twice the duration of a unit interval and a duty cycle greater than 50%. The second control signal may be a phase shifted version of the first control signal. The second sampling clock signal may be an inverted version of the first sampling clock signal.

In some implementations, the first plurality of feedback signals includes delayed versions of the output of the first sampler and delayed versions of the output of the second sampler. The second plurality of feedback signals may include delayed versions of the output of the second sampler and delayed versions of the output of the first sampler.

The operational steps described in any of the exemplary aspects herein are described to provide a subset of examples of possible implementations. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various operations of methods described above may be performed by any suitable means capable of performing the corresponding functions. The means may include various hardware and/or software component(s) and/or module (s), including, but not limited to a circuit, an application-specific integrated circuit (ASIC), or processor. Generally, where there are operations illustrated in figures, those operations may have corresponding counterpart means-plus-function components with similar numbering.

In certain aspects, an apparatus includes means for summing currents representative of a data signal and a first plurality of feedback signals. The means for summing currents may be configured to provide a first summed output signal. In some implementations, the currents representative of the data signal and the first plurality of feedback signals may be summed when the first control signal is in a first signaling state. The means for sampling the first summed output signal may be operated in accordance with timing provided by a first sampling clock signal. The first control signal may be in the first signaling state for a duration that is longer than a unit interval that defines the interval in which a bit of data is encoded in the data signal.

In certain implementations, the apparatus has means for summing currents representative of the data signal and a second plurality of feedback signals. The means for summing currents representative of the data signal and a second plurality of feedback signals may be configured to provide a second summed output signal. The currents representative of the data signal and the second plurality of feedback signals may be summed when the second control signal is in the first signaling state. The apparatus may have means for sampling the second summed output signal in accordance with timing provided by a second sampling clock signal. The second control signal may be in the first signaling state for a duration that is longer than one unit interval. In one example, each of the first control signal and the second control signal has a period that is twice the duration of a unit interval and a duty cycle greater than 50%. In one example, the second control signal is a phase shifted version of the first control signal. In one example, the second sampling clock signal is an inverted version of the first sampling clock signal. The first plurality of feedback signals may include delayed versions of the output of the first sampler and delayed versions of the output of the second sampler. The second plurality of feedback signals may include delayed versions of the output of the second sampler and delayed versions of the output of the first sampler.

Some implementation examples are described in the following numbered clauses:

1. An equalizing circuit comprising: a first current summer configured to sum currents representative of a data signal and a first plurality of feedback signals when enabled by a first control signal, wherein the first current summer is enabled when the first control signal is in a first signaling state and disabled when the control signal is in a first signaling state; and a first sampler configured to sample an output of the first current summer in accordance with timing provided by a first sampling clock signal, wherein the first control signal is in the first signaling state for a duration that is longer than a unit interval that defines the interval in which a bit of data is encoded in the data signal.

2. The equalizing circuit as described in clause 1, wherein the first control signal has a period that is twice the duration of one unit interval.
3. The equalizing circuit as described in clause 1 or clause 2, further comprising: a first duty cycle control circuit adapted to configure a duty cycle greater than 50% for the first control signal.
4. The equalizing circuit as described in any of clauses 1-3, wherein the first sampler is configured to sample signaling state at the output of the first current summer at an edge in the first sampling clock signal and while the first control signal is in the first signaling state.
5. The equalizing circuit as described in any of clauses 1-4, further comprising: a second current summer configured to sum currents representative of the data signal and a second plurality of feedback signals when enabled by a second control signal, wherein the second current summer is enabled when the second control signal is in the first signaling state and disabled when the control signal is in the first signaling state; and a second sampler configured to sample an output of the second current summer in accordance with timing provided by a second sampling clock signal, wherein the second control signal is in the first signaling state for a duration that is longer than one unit interval.
6. The equalizing circuit as described in clause 5, wherein the second control signal has a period that is twice the duration of a unit interval.
7. The equalizing circuit as described in clause 5 or clause 6, further comprising: a second duty cycle control circuit adapted to configure a duty cycle greater than 50% for the second control signal.
8. The equalizing circuit as described in any of clauses 5-7, wherein the second sampler is configured to sample signaling state at the output of the second current summer at an edge in the second sampling clock signal and while the second control signal is in the first signaling state.
9. The equalizing circuit as described in any of clauses 5-8, wherein the second control signal is a phase shifted version of the first control signal and wherein the second sampling clock signal is an inverted version of the first sampling clock signal.
10. The equalizing circuit as described in any of clauses 5-9, wherein the first plurality of feedback signals includes delayed versions of the output of the first sampler and delayed versions of the output of the second sampler, and wherein the second plurality of feedback signals includes delayed versions of the output of the second sampler and delayed versions of the output of the first sampler.
11. An apparatus, comprising: means for summing currents representative of a data signal and a first plurality of feedback signals and configured to provide a first summed output signal, wherein the currents representative of the data signal and the first plurality of feedback signals are summed when a first control signal is in a first signaling state; and means for sampling the first summed output signal in accordance with timing provided by a first sampling clock signal, wherein the first control signal is in the first signaling state for a duration that is longer than a unit interval that defines the interval in which a bit of data is encoded in the data signal.
12. The apparatus as described in clause 11, further comprising: means for summing currents representative of the data signal and a second plurality of feedback signals and configured to provide a second summed output signal, wherein the currents representative of the data signal and the second plurality of feedback signals are summed when a second control signal is in the first signaling state; and means for sampling the second summed output signal in accordance with timing provided by a second sampling clock signal, wherein the second control signal is in the first signaling state for a duration that is longer than one unit interval.
13. The apparatus as described in clause 12, wherein each of the first control signal and the second control signal has a period that is twice the duration of a unit interval and a duty cycle greater than 50%.
14. The apparatus as described in clause 12 or clause 13, wherein the second control signal is a phase shifted version of the first control signal and wherein the second sampling clock signal is an inverted version of the first sampling clock signal.
15. The apparatus as described in any of clauses 12-14, wherein the first plurality of feedback signals includes delayed versions of the output of the means for sampling the first summed output signal and delayed versions of the output of the means for sampling the second summed output signal, and wherein the second plurality of feedback signals includes delayed versions of the output of the means for sampling the second summed output signal and delayed versions of the output of the means for sampling the first summed output signal.
16. A method for equalizing a data signal received over a serial data link, comprising: summing currents representative of a data signal and a first plurality of feedback signals to provide a first summed output signal, wherein the currents representative of the data signal and the first plurality of feedback signals are summed when a first control signal is in a first signaling state; and sampling the first summed output signal in accordance with timing provided by a first sampling clock signal, wherein the first control signal is in the first signaling state for a duration that is longer than a unit interval that defines the interval in which a bit of data is encoded in the data signal.
17. The method as described in clause 16, further comprising: summing currents representative of the data signal and a second plurality of feedback signals to provide a second summed output signal, wherein the currents representative of the data signal and the second plurality of feedback signals are summed when a second control signal is in the first signaling state; and sampling the second summed output signal in accordance with timing provided by a second sampling clock signal, wherein the second control signal is in the first signaling state for a duration that is longer than one unit interval.
18. The method as described in clause 17, wherein each of the first control signal and the second control signal has a period that is twice the duration of a unit interval and a duty cycle greater than 50%.
19. The method as described in clause 17 or clause 18, wherein the second control signal is a phase shifted version of the first control signal and wherein the second sampling clock signal is an inverted version of the first sampling clock signal.
20. The method as described in any of clauses 17-19, wherein the first plurality of feedback signals includes delayed versions of the first summed output signal and delayed versions of the second summed output signal, and wherein the second plurality of feedback signals includes delayed versions of the second summed output signal and delayed versions of the first summed output signal.

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An equalizing circuit comprising:

a first current summer configured to sum currents representative of a data signal and a first plurality of feedback signals when enabled by a first control signal, wherein the first current summer is enabled when the first control signal is in a first signaling state and disabled when the first control signal is in a second signaling state; and a first sampler configured to sample an output of the first current summer in accordance with timing provided by a first sampling clock signal, wherein the first control signal is in the first signaling state for a duration that is longer than a unit interval that defines an interval in which a bit of data is encoded in the data signal.

2. The equalizing circuit of claim 1, wherein the first control signal has a period that is twice the duration of one unit interval.

3. The equalizing circuit of claim 1, further comprising:

a first duty cycle control circuit adapted to configure a duty cycle greater than 50% for the first control signal.

4. The equalizing circuit of claim 1, wherein the first sampler is configured to sample signaling state at the output of the first current summer at an edge in the first sampling clock signal and while the first control signal is in the first signaling state.

5. The equalizing circuit of claim 1, further comprising:

a second current summer configured to sum currents representative of the data signal and a second plurality of feedback signals when enabled by a second control signal, wherein the second current summer is enabled when the second control signal is in the first signaling state and disabled when the control signal is in the second signaling state; and a second sampler configured to sample an output of the second current summer in accordance with timing provided by a second sampling clock signal, wherein the second control signal is in the first signaling state for a duration that is longer than one unit interval.

6. The equalizing circuit of claim 5, wherein the second control signal has a period that is twice the duration of a unit interval.

7. The equalizing circuit of claim 5, further comprising:

a second duty cycle control circuit adapted to configure a duty cycle greater than 50% for the second control signal.

8. The equalizing circuit of claim 5, wherein the second sampler is configured to sample signaling state at the output of the second current summer at an edge in the second sampling clock signal and while the second control signal is in the first signaling state.

9. The equalizing circuit of claim 5, wherein the second control signal is a phase shifted version of the first control signal and wherein the second sampling clock signal is an inverted version of the first sampling clock signal.

10. The equalizing circuit of claim 5, wherein the first plurality of feedback signals includes delayed versions of the output of the first sampler and delayed versions of the output of the second sampler, and wherein the second plurality of feedback signals includes delayed versions of the output of the second sampler and delayed versions of the output of the first sampler.

11. An apparatus, comprising:

means for summing currents representative of a data signal and a first plurality of feedback signals and configured to provide a first summed output signal, wherein the currents representative of the data signal and the first plurality of feedback signals are summed when a first control signal is in a first signaling state; and means for sampling the first summed output signal in accordance with timing provided by a first sampling clock signal, wherein the first control signal is in the first signaling state for a duration that is longer than a unit interval that defines an interval in which a bit of data is encoded in the data signal.

12. The apparatus of claim 11, further comprising:

means for summing currents representative of the data signal and a second plurality of feedback signals and configured to provide a second summed output signal, wherein the currents representative of the data signal and the second plurality of feedback signals are summed when a second control signal is in the first signaling state; and means for sampling the second summed output signal in accordance with timing provided by a second sampling clock signal, wherein the second control signal is in the first signaling state for a duration that is longer than one unit interval.

13. The apparatus of claim 12, wherein each of the first control signal and the second control signal has a period that is twice the duration of a unit interval and a duty cycle greater than 50%.

14. The apparatus of claim 12, wherein the second control signal is a phase shifted version of the first control signal and wherein the second sampling clock signal is an inverted version of the first sampling clock signal.

15. The apparatus of claim 12, wherein the first plurality of feedback signals includes delayed versions of the output of the means for sampling the first summed output signal and delayed versions of the output of the means for sampling the second summed output signal, and wherein the second plurality of feedback signals includes delayed versions of the output of the means for sampling the second summed output signal and delayed versions of the output of the means for sampling the first summed output signal.

16. A method for equalizing a data signal received over a serial data link, comprising:

summing currents representative of a data signal and a first plurality of feedback signals to provide a first summed output signal, wherein the currents representative of the data signal and the first plurality of feedback signals are summed when a first control signal is in a first signaling state; and sampling the first summed output signal in accordance with timing provided by a first sampling clock signal, wherein the first control signal is in the first signaling state for a duration that is longer than a unit interval that defines the interval an interval in which a bit of data is encoded in the data signal.

17. The method of claim 16, further comprising:

summing currents representative of the data signal and a second plurality of feedback signals to provide a second summed output signal, wherein the currents representative of the data signal and the second plurality of feedback signals are summed when a second control signal is in the first signaling state; and sampling the second summed output signal in accordance with timing provided by a second sampling clock signal, wherein the second control signal is in the first signaling state for a duration that is longer than one unit interval.

18. The method of claim 17, wherein each of the first control signal and the second control signal has a period that is twice the duration of a unit interval and a duty cycle greater than 50%.

19. The method of claim 17, wherein the second control signal is a phase shifted version of the first control signal and wherein the second sampling clock signal is an inverted version of the first sampling clock signal.

20. The method of claim 17, wherein the first plurality of feedback signals includes delayed versions of the first summed output signal and delayed versions of the second summed output signal, and wherein the second plurality of feedback signals includes delayed versions of the second summed output signal and delayed versions of the first summed output signal.

* * * * *